United States Patent
Shany et al.

(10) Patent No.: US 9,071,435 B2
(45) Date of Patent: Jun. 30, 2015

(54) SYSTEM AND METHOD FOR TUNING TRANSMISSION PARAMETERS IN MULTI-USER MULTIPLE-INPUT-MULTIPLE-OUTPUT SYSTEMS WITH AGED AND NOISY CHANNEL ESTIMATION

(75) Inventors: Yaron Shany, Kfar Saba (IL); Nir Shapira, Ra'anana (IL); Gilad Kirshenberg, Ra'anana (IL)

(73) Assignee: Celeno Communications Ltd., Ra'anana (IL)

( * ) Notice: Subject to any disclaimer, the term of this patent is extended or adjusted under 35 U.S.C. 154(b) by 448 days.

(21) Appl. No.: 13/206,018

(22) Filed: Aug. 9, 2011

(65) Prior Publication Data
US 2012/0063336 A1    Mar. 15, 2012

Related U.S. Application Data

(63) Continuation-in-part of application No. 13/081,233, filed on Apr. 6, 2011, which is a continuation of application No. 11/430,136, filed on May 9, 2006, now abandoned, which is a continuation-in-part of
(Continued)

(51) Int. Cl.
*H04L 12/26*    (2006.01)
*H04L 1/20*    (2006.01)
*H04B 7/04*    (2006.01)
(Continued)

(52) U.S. Cl.
CPC ............. *H04L 1/203* (2013.01); *H04B 7/0452* (2013.01); *H04B 7/0617* (2013.01); *H04B 7/0626* (2013.01); *H04B 7/0656* (2013.01); *H04L 1/0003* (2013.01); *H04L 1/0009* (2013.01);
(Continued)

(58) Field of Classification Search
CPC ..... H04W 16/00; H04W 16/24; H04W 40/06; H04W 88/08; H04W 52/241; H04L 1/0009; H04L 1/0003; H04L 1/0026; H04B 7/0413; H04B 7/0632
See application file for complete search history.

(56) References Cited

U.S. PATENT DOCUMENTS

| 5,864,548 A | 1/1999 | Liu |
| 6,166,667 A | 12/2000 | Park |

(Continued)

OTHER PUBLICATIONS

Tse et al., "Fundamentals of Wireless Communication", Cambridge University Press, Sep. 10, 2004, pp. 523-548.
(Continued)

*Primary Examiner* — Vladimir Magloire
*Assistant Examiner* — Shantell L Heiber
(74) *Attorney, Agent, or Firm* — Pearl Cohen Zedek Latzer Baratz LLP

(57) ABSTRACT

System and method for tuning transmission parameters based on estimated ratio between a signal to an estimated interference plus noise (SINR) of a user, in a multiple-user multiple-input multiple-output (MU-MIMO) communication system, the method including obtaining channel state information (CSI) related to a channel from an access point (AP) to users that participate in a next MU-MIMO transmission, wherein the AP, and the users pertain to the MU-MIMO communication system, obtaining error coefficients related to errors related to channel-ageing and to estimation noise of the CSI, and calculating the estimated SINR, wherein the estimated interference is related to power of the other users and to the estimated channel magnitude the user u, and to the error coefficients, wherein the estimated channel magnitude is derived from the CSI.

16 Claims, 8 Drawing Sheets

Related U.S. Application Data application No. 11/319,526, filed on Dec. 29, 2005, now Pat. No. 7,656,965.

(60) Provisional application No. 61/371,951, filed on Aug. 9, 2010.

(51) Int. Cl.
  *H04L 1/00* (2006.01)
  *H04B 17/336* (2015.01)
  *H04B 7/06* (2006.01)
  *H04L 1/06* (2006.01)
(52) U.S. Cl.
  CPC ... *H04L 1/06* (2013.01); *H04L 1/20* (2013.01); *H04B 17/336* (2015.01)

(56) References Cited

U.S. PATENT DOCUMENTS

| | | | |
|---|---|---|---|
| 6,563,858 B1 | 5/2003 | Fakatselis et al. | |
| 6,873,293 B2 | 3/2005 | Proctor, Jr. et al. | |
| 6,895,258 B1 | 5/2005 | Scherzer et al. | |
| 6,928,047 B1 | 8/2005 | Xia | |
| 6,940,843 B2 | 9/2005 | Goodall et al. | |
| 6,961,545 B2 | 11/2005 | Tehrani et al. | |
| 6,970,682 B2 | 11/2005 | Crilly, Jr. et al. | |
| 6,999,430 B2 | 2/2006 | Holtzman et al. | |
| 7,034,759 B2 | 4/2006 | Proctor, Jr. et al. | |
| 7,039,090 B2 | 5/2006 | Boetzel et al. | |
| 7,039,137 B1 | 5/2006 | Lauterjung et al. | |
| 7,050,402 B2 | 5/2006 | Schmidl et al. | |
| 7,088,671 B1 | 8/2006 | Monsen | |
| 7,099,380 B1 | 8/2006 | Feng et al. | |
| 7,103,326 B2 | 9/2006 | Wu et al. | |
| 7,120,468 B1 | 10/2006 | Wilhoyte et al. | |
| 7,139,321 B2 | 11/2006 | Giannakis et al. | |
| 7,139,323 B2 | 11/2006 | Erving et al. | |
| 7,149,254 B2 | 12/2006 | Sampath | |
| 7,289,585 B2 | 10/2007 | Sandhu et al. | |
| 7,319,888 B2 | 1/2008 | Li et al. | |
| 7,352,718 B1 * | 4/2008 | Perahia et al. | 370/329 |
| 7,656,965 B2 | 2/2010 | Shapira et al. | |
| 2002/0041635 A1 | 4/2002 | Ma et al. | |
| 2002/0061031 A1 | 5/2002 | Sugar et al. | |
| 2002/0097780 A1 | 7/2002 | Odenwalder et al. | |
| 2002/0146981 A1 | 10/2002 | Saint-Hilaire et al. | |
| 2002/0150168 A1 | 10/2002 | Crawford | |
| 2002/0160737 A1 | 10/2002 | Crawford | |
| 2002/0181546 A1 | 12/2002 | Odenwalder et al. | |
| 2002/0188750 A1 | 12/2002 | Li | |
| 2003/0112901 A1 | 6/2003 | Gupta | |
| 2003/0128658 A1 | 7/2003 | Walton et al. | |
| 2003/0139196 A1 | 7/2003 | Medvedev et al. | |
| 2004/0125820 A1 | 7/2004 | Rios | |
| 2004/0258012 A1 | 12/2004 | Ishii | |
| 2005/0025042 A1 | 2/2005 | Hadad | |
| 2005/0025176 A1 | 2/2005 | Ko et al. | |
| 2005/0030929 A1 | 2/2005 | Swier et al. | |
| 2005/0047322 A1 | 3/2005 | Sondur | |
| 2005/0047384 A1 | 3/2005 | Wax et al. | |
| 2005/0063408 A1 | 3/2005 | Famolari | |
| 2005/0105629 A1 | 5/2005 | Hottinen et al. | |
| 2005/0124369 A1 | 6/2005 | Attar et al. | |
| 2005/0135284 A1 | 6/2005 | Nanda et al. | |
| 2005/0136933 A1 | 6/2005 | Sandhu et al. | |
| 2005/0141412 A1 | 6/2005 | Sadri et al. | |
| 2005/0147023 A1 | 7/2005 | Stephens et al. | |
| 2005/0152324 A1 | 7/2005 | Benveniste | |
| 2005/0169232 A1 | 8/2005 | Sakoda et al. | |
| 2005/0233709 A1 | 10/2005 | Gardner et al. | |
| 2005/0255892 A1 | 11/2005 | Wong et al. | |
| 2005/0270975 A1 * | 12/2005 | Meylan et al. | 370/229 |
| 2005/0286474 A1 | 12/2005 | van Zelst et al. | |
| 2006/0023803 A1 | 2/2006 | Perlman et al. | |
| 2006/0030364 A1 | 2/2006 | Olesen et al. | |
| 2006/0039312 A1 | 2/2006 | Walton et al. | |
| 2006/0062189 A1 | 3/2006 | Takeuchi | |
| 2006/0067421 A1 | 3/2006 | Walton et al. | |
| 2006/0078059 A1 | 4/2006 | Ok et al. | |
| 2006/0092885 A1 | 5/2006 | Brockmann et al. | |
| 2006/0104379 A1 | 5/2006 | Li et al. | |
| 2006/0109814 A1 | 5/2006 | Kuminiskiy et al. | |
| 2006/0120225 A1 | 6/2006 | Choi | |
| 2006/0140172 A1 | 6/2006 | Trainin | |
| 2006/0140290 A1 | 6/2006 | Li et al. | |
| 2006/0164972 A1 | 7/2006 | van Rensburg et al. | |
| 2006/0165114 A1 | 7/2006 | Diepstraten et al. | |
| 2006/0203935 A1 | 9/2006 | Li et al. | |
| 2006/0280116 A1 | 12/2006 | Ji et al. | |
| 2006/0286937 A1 | 12/2006 | Russell et al. | |
| 2006/0291439 A1 | 12/2006 | Yang et al. | |
| 2006/0291544 A1 | 12/2006 | Fischer et al. | |
| 2007/0077936 A1 | 4/2007 | Tomisawa et al. | |
| 2007/0153714 A1 | 7/2007 | Shapira et al. | |
| 2007/0153748 A1 | 7/2007 | Shapira | |
| 2007/0153760 A1 | 7/2007 | Shapira | |
| 2007/0155353 A1 | 7/2007 | Shapira et al. | |
| 2007/0177681 A1 | 8/2007 | Choi et al. | |
| 2007/0280360 A1 | 12/2007 | Ihm et al. | |

OTHER PUBLICATIONS

T. Yoo and A. Goldsmith, "On the optimality of multiantenna broadcast scheduling using zero-forcing beamforming," IEEE J. Select. Areas in Commun., vol. 24, No. 3, pp. 528-541, Mar. 2006.

Kant et al., "fast link adaptation for ieee 802.11n" Master's Thesis, The Faculty of Engineering and Science Aalborg University; project period Feb. 5, 2007-Aug. 6, 2007; Available on-line in: http://kom.aau.dk/~tlj/Fast%20Link%20Adaptation%20for%20IEEE%20802.11n.pdf.

Tsai et al. "Effective-SNR Mapping for Modeling Frame Error Rates in Multiple-State Channels" 3 GPP-C30-20030429-010; Apr. 29, 2003.

IEEE-Std 802.11n-2009;Part 11: Wireless LAN Medium Access Control (MAC) and Physical Layer (PHY) Specifications: Higher Speed Physical Layer (PHY); Amendment 5: Enhancements for Higher Throughput; Oct. 29, 2009.

IEEE-Std 802.11b-1999 Supplement to 802.11-1999, Part 11: Wireless LAN Medium Access Control (MAC) and Physical Layer (PHY) Specifications: Higher Speed Physical Layer (PHY) Extension in the 2.4 GHz Band; Jan. 20, 2000.

IEEE-Std 802.11, 1999 Edition (ISO/IEC 8802-11: 1999); Part 11: Wireless LAN Medium Access Control (MAC) and Physical Layer (PHY) Specifications; Aug. 20, 1999.

IEEE-Std 802.11a-1999 Part 11: Wireless LAN Medium Access Control (MAC) and Physical Layer (PHY) Specifications: High Speed Physical Layer (PHY) Extension in the 5 GHz Band; Dec. 30, 1999.

IEEE-Std 802.11g-2003n Supplement to 802.11-1999, Wireless LAN MAC and PHY Specifications: Further Higher Data Rate Extension in the 2.4 GHz Band, Draft 8.2; Jun. 27, 2003.

IEEE-Std 802.11e-2005 Specific Requierments Part 11: Wireless LAN Medium Access Control (MAC) and Physical Layer (PHY) Specifications Amendment 8: Medium Access Control (MAC) Quality of Service Enhancements; Jan. 2005.

Notice of Allowance of U.S. Appl. No. 11/319,526 mailed on May 29, 2009.

Office Action of U.S. Appl. No. 11/319,526 mailed on Oct. 15, 2008.

Notice of Allowance of U.S. Appl. No. 11/319,526 mailed on Sep. 15, 2009.

Office Action of U.S. Appl. No. 11/430,136 mailed on May 30, 2008.

Final Office Action of U.S. Appl. No. 11/430,136 mailed on Dec. 19, 2008.

Office Action of U.S. Appl. No. 11/430,136 mailed on Aug. 28, 2009.

Office Action of U.S. Appl. No. 11/430,136 mailed on Apr. 27, 2010.

Final Office Action of U.S. Appl. No. 11/430,136 mailed on Dec. 6, 2010.

* cited by examiner

SYSTEM AND METHOD FOR TUNING TRANSMISSION PARAMETERS IN MULTI-USER MULTIPLE-INPUT-MULTIPLE-OUTPUT SYSTEMS WITH AGED AND NOISY CHANNEL ESTIMATION

CROSS REFERENCE TO RELATED APPLICATIONS

This application claims the benefit of U.S. Provisional Patent Application No. 61/371,951, filed on Aug. 9, 2010, and is a continuation-in-part application of U.S. patent application Ser. No. 13/081,233, filed on Apr. 6, 2011, which is a continuation application of U.S. patent application Ser. No. 11/430,136, filed on May 9, 2006, now abandoned, which is a continuation-in-part application of U.S. patent application Ser. No. 11/319,526, filed on Dec. 29, 2005, and issued as U.S. Pat. No. 7,656,965, the entire contents of which is incorporated herein by reference.

FIELD OF THE INVENTION

The present invention relates to the field of wireless communication. In particular, embodiments of the present invention relate to multi-user multiple-input-multiple-output systems.

BACKGROUND OF THE INVENTION

Spatial Division Multiple Access (SDMA) is a method of multiplexing several signal streams, each one targeted to a different destination, simultaneously, by utilizing multiple transmit antennas. An SDMA channel access method may enable the use of the same frequency at the same time to communicate with several stations located in different places. For example, an SDMA Access Point (AP) having multiple antennas may use a beamforming technique to transmit to several remote stations (STAB), also referred to as users simultaneously. Each transmit antenna may transmit the intended signal multiplied by a certain weight, and by dynamically controlling the weights of each antenna the transmission may be directed to a desired location. In Multi-User Multiple-Input-Multiple-Output (MU MIMO) communication systems, a multi-antenna AP may transmit simultaneously to several multiple-antenna users, using SDMA technique.

Channel state information (CSI) may be estimated by an explicit sounding exchange. In explicit sounding exchange, the AP may send a sounding frame from which the intended user may estimate the CSI between the AP antennas and the user antennas. In sounding feedback, each user can return CSI. Using this information, the AP may design the transmit beamforming vectors that may assure good signal-to-interference-plus-noise ratio (SINR) for the data streams of users.

After designing the transmit beamforming vectors, the AP may estimate SINR of each stream of each user, and the obtained SINR values may be used for choosing transmission parameters such as data rate, modulation and coding scheme (MCS), bandwidth, number of spatial streams, etc for each user. In many applications it is desired that the AP will choose transmission parameters that will allow maximal data rate under required quality levels, typically given as maximal allowed packet error rate (PER).

SUMMARY OF THE INVENTION

A according to embodiments of the present invention, there is provided a method for tuning transmission parameters based on estimated ratio between a signal to an estimated interference plus noise (SINR) of a user, in a multiple-user multiple-input multiple-output (MU-MIMO) communication system, the method may include obtaining channel state information (CSI) related to a channel from an AP to the user, denoted u, and to channels from the AP to other users wherein the user and the other users pertain to the MU-MIMO communication system and participate in a next MU-MIMO transmission; obtaining error coefficients related to errors related to channel-ageing and to estimation noise of the CSI; and calculating the estimated SINR, wherein the estimated interference is related to power of the other users and to the estimated channel magnitude of the user u, and to the error coefficients, wherein the estimated channel magnitude may be derived from the CSI.

A according to embodiments of the present invention, the method may further include selecting the transmission parameters based on the estimated SINR; and transmitting data to the user using the selected transmission parameters.

A according to embodiments of the present invention, the error coefficients may include a first coefficient, and the estimated interference may include an ageing term, the aging term may equal the power of the other users multiplied by the estimated squared channel magnitude, scaled by the first coefficient.

A according to embodiments of the present invention, the error coefficients may include a second coefficient, and the estimated interference may include a noise term, the noise term may equal the power of the other users, scaled by the second coefficient.

A according to embodiments of the present invention, the error coefficients may include a third coefficient and the estimated interference may include a cross term, the cross term may equal the power of the other users multiplied by the estimated channel magnitude, scaled by the third coefficient.

A according to embodiments of the present invention, a plurality of values for the error coefficients may be used for different aging durations, different Doppler frequencies and different subcarrier grouping values in a multi-carrier system.

A according to embodiments of the present invention, transmission may be performed over at least one subcarrier, the CSI may substantially be the same over all of the at least one subcarrier, and the CSI may be in the form of channel coefficients $\hat{h}_u$ and the error coefficients may include an aging coefficient $x_{aging}$, a noise coefficient $x_{noise}$, and a cross coefficient $y$, and the calculating of the estimated SINR, denoted $\gamma_u$ may be done by:

$$\gamma_u^{-1} = \frac{\text{interference} + \sigma^2}{\text{signal}}$$

$$\approx \frac{(p_{tot} - p_u) \cdot \left( \|\hat{h}_u\|^2 x_{aging} + x_{noise} + 2y\|\hat{h}_u\| \sqrt{x_{aging} \cdot x_{noise}} \right) + \sigma^2}{p_u |b_u^* \hat{h}_u|^2}$$

where:
- $p_u$ denotes power allocated to the user u,
- $p_{tot} := \Sigma_u p_u$ denotes total transmission power, such that $(p_{tot} - p_u)$ may equal the power allocated to the other users,
- $b_u$ denotes a complex conjugate of a transmit beamforming vector for the user u,
- $p_u |b_u^* \hat{h}_u|^2$ denotes the signal,
- $\|\hat{h}_u\|$ denotes the estimated channel magnitude,
- $\|\hat{h}_u\|^2$ denotes the estimated squared channel magnitude,
- and $\sigma^2$ denotes a noise variance of the user u,
- wherein $p_u$ and $b_u$ may be derived from the CSI.

A according to embodiments of the present invention, transmission may performed over a plurality of subcarriers, and the obtaining of the CSI may include obtaining the CSI for substantially each subcarrier and the calculating the estimated SINR may include calculating a plurality of per-subcarrier estimated SINRs, each for a specific subcarrier; and unifying the plurality of per-subcarrier estimated SINRs to receive the estimated SINR.

A according to embodiments of the present invention, the user may receive a single stream, the CSI may be in a form selectable from: $\{d_{u,f}\}_f$, $\{v_{u,f}\}_f$ of one singular mode out of all D's and all V's of the SVD of the channel, and the products $\{d_{u,f}v_{u,f}^*\}_f$ of all D's and all V's of the SVD of the channel, were f denotes a subcarrier, and the error coefficients may include an aging coefficient $x_{aging}$, a noise coefficient $x_{noise}$, and a cross coefficient y, for all the subcarriers and the calculating of the plurality of per-subcarrier estimated SINRs, denoted $\hat{\gamma}_{u,f}$, may be done by:

$$(\hat{\gamma}_{u,f}^{aging+noise})^{-1} := \frac{(p_{tot,f} - p_{u,f}) \cdot \left(d_{u,f}^2 x_{aging} + x_{noise} \cdot \tilde{p}_f + 2y \cdot \sqrt{\tilde{p}_f} \cdot d_{u,f} \sqrt{x_{aging} \cdot x_{noise}}\right)}{p_{u,f} \cdot d_{u,f}^2 \cdot |v_{u,f}^* b_{u,f}|^2}$$

$$(\hat{\gamma}_{u,f}^{no-err.})^{-1} := \frac{\tilde{p}_f \cdot \sigma_{u,f}^2}{p_{u,f} \cdot d_{u,f}^2 |v_{u,f}^* b_{u,f}|^2}, \text{ and}$$

$$(\hat{\gamma}_{u,f})^{-1} := (\hat{\gamma}_{u,f}^{aging+noise})^{-1} + (\hat{\gamma}_{u,f}^{no-err.})^{-1}$$

and the unifying of the plurality of per-subcarrier estimated SINRs may be done using an effective SINR calculator, where:
$\tilde{p}_f$ denotes the transmission power during sounding at the subcarrier f,
$p_{u,f}$ denotes power used during data transmission for the user u at the subcarrier f,
$p_{tot,f}$ denotes total power at the subcarrier f, such that $(p_{tot,f} - p_{u,f})$ may equal the power allocated to the other users at the subcarrier f,
$\sigma_{u,f}^2$ denotes a noise variance of the user u at the subcarrier f, and $b_{u,f}$ are transmit beamforming vectors for the user u at the subcarrier f,
$p_u(d_{u,f}^2/\tilde{p}_f) \cdot |v_{u,f}^* b_{u,f}|^2)$ denotes the signal of the user u at the subcarrier f,
$d_{u,f}/\sqrt{\tilde{p}_f}$ denotes the estimated channel magnitude of the user u at the subcarrier f,
$(d_{u,f}/\sqrt{\tilde{p}_f})^2$ denotes the estimated squared channel magnitude of the user u at the subcarrier f,
$\hat{\gamma}_{u,f}^{aging+noise}$ denotes per-subcarrier signal-to-interference ratios of the user u at the subcarrier f, and
$\hat{\gamma}_{u,f}^{no-err.}$ denotes per-subcarrier SNRs of the user u at the subcarrier f,
wherein $p_{u,f}$ and $b_{u,f}$ may be derived from the CSI.

A according to embodiments of the present invention, the user may have a plurality of antennas but may receive a single stream, the error coefficients may include an aging coefficient $x_{aging}$, a noise coefficient $x_{noise}$, and a cross coefficient y, and the calculating of the plurality of per-subcarrier estimated SINRs may include calculating an effective channel matrix after transmit beamforming based on the CSI, transmit beamforming vectors for substantially all users, and power used while the obtaining of the CSI; calculating an assumed receive beamforming vector, at subcarrier f for a single stream of the user u, based on the effective channel matrix; and calculating an effective channel coefficients vector, denoted $\hat{h}_{eff,u,f}$, based on the assumed receive beamforming vector, the CSI and the power used while the obtaining of the CSI, wherein the calculating of the plurality of per-subcarrier estimated SINRs may be done by:

$$(\hat{\gamma}_{u,f}^{aging+noise})^{-1} = \frac{(p_{tot,f} - p_{u,f}) \cdot \left(\|\hat{h}_{eff,u,f}\|^2 x_{aging} + x_{noise} + 2y\|\hat{h}_{eff,u,f}\|\sqrt{x_{aging} \cdot x_{noise}}\right)}{p_{u,f}|\hat{h}_{eff,u,f} b_{u,f}|^2}$$

$$(\hat{\gamma}_{u,f}^{no-err.})^{-1} := \frac{\sigma_{u,f}^2}{p_{u,f}|\hat{h}_{eff,u,f} b_{u,f}|^2}, \text{ and}$$

$$(\hat{\gamma}_{u,f})^{-1} := (\hat{\gamma}_{u,f}^{aging+noise})^{-1} + (\hat{\gamma}_{u,f}^{no-err.})^{-1}$$

where:
$p_{u,f}$ denotes power used during data transmission for the user u at the subcarrier f,
$p_{tot,f}$ denotes total power at the subcarrier f, such that $(p_{tot,f} - p_{u,f})$ may equal the power allocated to the other users at the subcarrier f,
$b_{u,f}$ denotes a transmit beamforming vector for the user u at the subcarrier f,
$p_{u,f}|\hat{h}_{eff,u,f} b_{u,f}|^2$ denotes the signal of the user u at the subcarrier f,
$\|\hat{h}_{eff,u,f}\|$ denotes the estimated effective channel magnitude of the user u at the subcarrier f,
$\|\hat{h}_{eff,u,f}\|^2$ denotes the estimated effective squared channel magnitude of the user u at the subcarrier f,
$\sigma_{u,f}^2$ denotes a noise variance of the user u at the subcarrier f,
$\hat{\gamma}_{u,f}^{aging+noise}$ denotes per-subcarrier signal-to-interference ratios, and
$\hat{\gamma}_{u,f}^{no-err.}$ denotes per-subcarrier SNRs.

A according to embodiments of the present invention, transmission may be performed over a plurality of subcarriers, and the user may have a plurality of antennas and may receive multiple streams, and the obtaining of the CSI may include obtaining the CSI for substantially each subcarrier and each stream, and the error coefficients may include an aging coefficient $x_{aging}$, a noise coefficient $x_{noise}$, and a cross coefficient y, and the calculating the estimated SINRs may include: calculating a plurality of per-subcarrier, per stream estimated SINRs, each for a specific subcarrier and a specific stream, by: calculating an effective channel matrix after transmit beamforming based on the CSI and the transmit beamforming vectors for substantially all users and power used while the obtaining of the CSI; calculating an assumed receive beamforming matrix, at subcarrier f and the user u, based on the effective channel matrix; calculating an effective channel coefficients matrix based on the assumed receive beamforming matrix, the CSI and the power used while the obtaining of the CSI, selecting effective channel coefficients vector, $\hat{h}_{eff,u,s,f}$, of stream s from the effective channel coefficients matrix; calculating the per-subcarrier per-stream estimated SINRs, $\hat{\gamma}_{u,s,f}$, of the user u under the assumption that streams of the user will not interfere each other, by:

$$(\hat{\gamma}_{u,s,f}^{aging+noise})^{-1} = \frac{(p_{tot,f} - p_{u,f}) \cdot \left(\|\hat{h}_{eff,u,s,f}\|^2 x_{aging} + x_{noise} + 2y\|\hat{h}_{eff,u,s,f}\|\sqrt{x_{aging} \cdot x_{noise}}\right)}{p_{u,s,f}|\hat{h}_{eff,u,s,f} b_{u,s,f}|^2}$$

-continued $$(\hat{\gamma}_{u,s,f}^{no-err.})^{-1} := \frac{\sigma_{u,f}^2}{p_{u,s,f}|\hat{h}_{eff,u,s,f}b_{u,s,f}|^2}$$

$$(\hat{\gamma}_{u,s,f})^{-1} := (\hat{\gamma}_{u,s,f}^{aging+noise})^{-1} + (\hat{\gamma}_{u,s,f}^{no-err.})^{-1}$$

where:

$p_{u,f}$ denotes power used during data transmission for the user u at the subcarrier f, $p_{tot,f}$ denotes total power at the subcarrier f, such that $(p_{tot,f} - p_{u,f})$ may equal the power allocated to the other users at the subcarrier f, $b_{u,s,f}$ denotes transmit beamforming vectors for the user u at the stream s at the subcarrier f, $p_{u,s,f}|\hat{h}_{eff,u,s,f}b_{u,s,f}|^2$ denotes the signal of the user u at the stream s at the subcarrier f, $\|\hat{h}_{eff,u,s,f}\|$ denotes the estimated effective channel magnitude of the user u at the stream s at the subcarrier f, $\|\hat{h}_{eff,u,s,f}\|^2$ denotes the estimated effective squared channel magnitude of the user u at the stream s at the subcarrier f, $\sigma_{u,f}^2$ denotes a noise variance of the user u at the subcarrier f, $\hat{\gamma}_{u,s,f}^{aging+noise}$ denotes per-subcarrier per-stream signal-to-interference ratios of the user u, and $\hat{\gamma}_{u,s,f}^{no-err.}$ denotes per-subcarrier per-stream SNRs of user u;

And unifying the plurality of per-subcarrier, per stream estimated SINRs to receive the estimated SINR.

A according to embodiments of the present invention, the method may include calculating the error coefficients based on estimation of the estimated SINR at the user.

A according to embodiments of the present invention, the user may have a plurality of antennas but may receive a single stream, transmission may be performed over a plurality of subcarriers, and the error coefficients may include an aging coefficient $x_{aging}$, a noise coefficient $x_{noise}$, and a cross coefficient y, and the calculating of the estimated SINR may include: calculating SNRs, denoted, $\hat{\gamma}_{u,f}^{no-err.}$, for each subcarrier f, based on CSI and beamforming vector related to the subcarrier f; calculating a single signal-to-interference ratio $(\hat{\gamma}_u^{aging+noise})^{-1}$ using:

unifying the SNRs to an effective SNR using an effective SNR calculator; and calculating estimated SINR based on the single signal-to-interference ratio and the effective SNR, where:

$p_u$ denotes power allocated to the user u, $p_{tot} := \Sigma_u p_u$ denotes total transmission power, such that $(p_{tot} - p_u)$ may equals the power allocated to the other users, $p_u(|b^*\hat{h}|^2)_{u,avg}$ denotes the signal of the user u averaged over the subcarriers, $\|\hat{h}\|_{u,avg}$ denotes an estimated effective channel magnitude of the user u averaged over the subcarriers, $(\|\hat{h}\|^2)_{u,avg}$ denotes an estimated effective squared channel magnitude of the user u averaged over the subcarriers, wherein $p_u$ may be derived from the CSI.

A according to embodiments of the present invention, the user may have a plurality of antennas and may receive a plurality of streams, wherein transmission may be performed over a plurality of subcarriers, and the error coefficients may include an aging coefficient $x_{aging}$, a noise coefficient $x_{noise}$, and a cross coefficient y, and the calculating of the estimated SINR may include: calculating signal to noise ratios (SNR), denoted, $\hat{\gamma}_{u,s,f}^{no-err.}$, for each stream s and subcarrier f, based on CSI and beamforming vector related to f; unifying vectors of SNR related to the user u and steam s along different subcarriers by an effective SNR calculator, to obtain SNRs for each user u and stream s, denoted $\hat{\gamma}_{u,s}^{no-err.}$; calculating a single signal-to-interference ratio $(\hat{\gamma}_u^{aging+noise})^{-1}$ for each user u and each stream s of user u, using:

$$(\hat{\gamma}_{u,s}^{aging+noise})^{-1} := \frac{(p_{tot} - p_u) \cdot \left(\left(\|\hat{h}\|^2\right)_{u,s,avg} x_{aging} + x_{noise} + 2y(\|\hat{h}\|_{u,s,avg})\sqrt{x_{aging} \cdot x_{noise}}\right)}{\left(p|b^*\hat{h}|^2\right)_{u,s,avg}}$$

where:

$p_u$ denotes power allocated to the user u, $p_{tot} := \Sigma_u p_u$ denotes total transmission power, such that $(p_{tot} - p_u)$ may equal the power allocated to the other users, $b^*$ represent a complex conjugate of a transmit beamforming vector for the user u, $p_u(|b^*\hat{h}|^2)_{u,s,avg}$ denotes the signal of the stream s of the user u averaged over the subcarriers, $\|\hat{h}\|_{u,s,avg}$ denotes an estimated effective channel magnitude of the stream s of the user u averaged over the subcarriers, $(\|\hat{h}\|^2)_{u,s,avg}$ denotes an estimated effective squared channel magnitude of the stream s of the user u averaged over the subcarriers, wherein $p_u$ and $b^*$ may be derived from the CSI; calculating estimated SINRs, denoted $\hat{\gamma}_{u,s}$, for the user u and the streams s of the user u based on the signal-to-interference ratios and the effective SNRs by:

$$(\hat{\gamma}_{u,s})^{-1} := (\hat{\gamma}_{u,s}^{no-err.})^{-1} + (\hat{\gamma}_{u,s}^{aging+noise})^{-1}; \text{ and}$$

unifying the estimated SINRs to an effective SINR using an effective SINR calculator.

A according to embodiments of the present invention, the method may further include receiving a goodness measure; selecting an initial MCS corresponding to the goodness measure; and finding an equivalent SNR denoted $\hat{\gamma}_{equ\_u}^{no-err.}$ that corresponds with the initial MCS, wherein the calculating of the estimated SINR, denoted $\hat{\gamma}_u$, may be done by:

$$\hat{\gamma}_u^{-1} = (\hat{\gamma}_{equ\_u}^{no-err.})^{-1} + (\hat{\gamma}_u^{aging+noise})^{-1}$$

where $\hat{\gamma}_u^{aging+noise}$ denotes a ratio between the signal and the estimated interference.

According to embodiments of the present invention there is provided a data processing system the data processing system may include: a processor; and a computer usable medium connected to the processor, wherein the computer usable medium contains a set of instructions for calculating a tuning transmission parameters based on estimated ratio between a signal to an estimated interference plus noise (SINR) of a user in a multiple-user multiple-input multiple-output (MU-MIMO) communication system, the MU-MIMO communication system may include an access point (AP), the user and other users, wherein the processor is designed to carry out a set of instructions to perform a method of: obtaining channel state information (CSI) related to a channel from the AP to the user, denoted u, and to channels from the AP to the other users, the CSI relates to estimated channel magnitudes; obtaining error coefficients related to errors related to channel-ageing and to estimation noise of the CSI; and calculating the estimated SINR, wherein the estimated interference is related to power of the other users and to the estimated channel magnitude, and to the error coefficients.

According to embodiments of the present invention the processor may be further designed to carry out a set of instructions to perform a method of: selecting the transmission parameters based on the estimated SINR; and transmitting data to the user using the selected transmission parameters.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
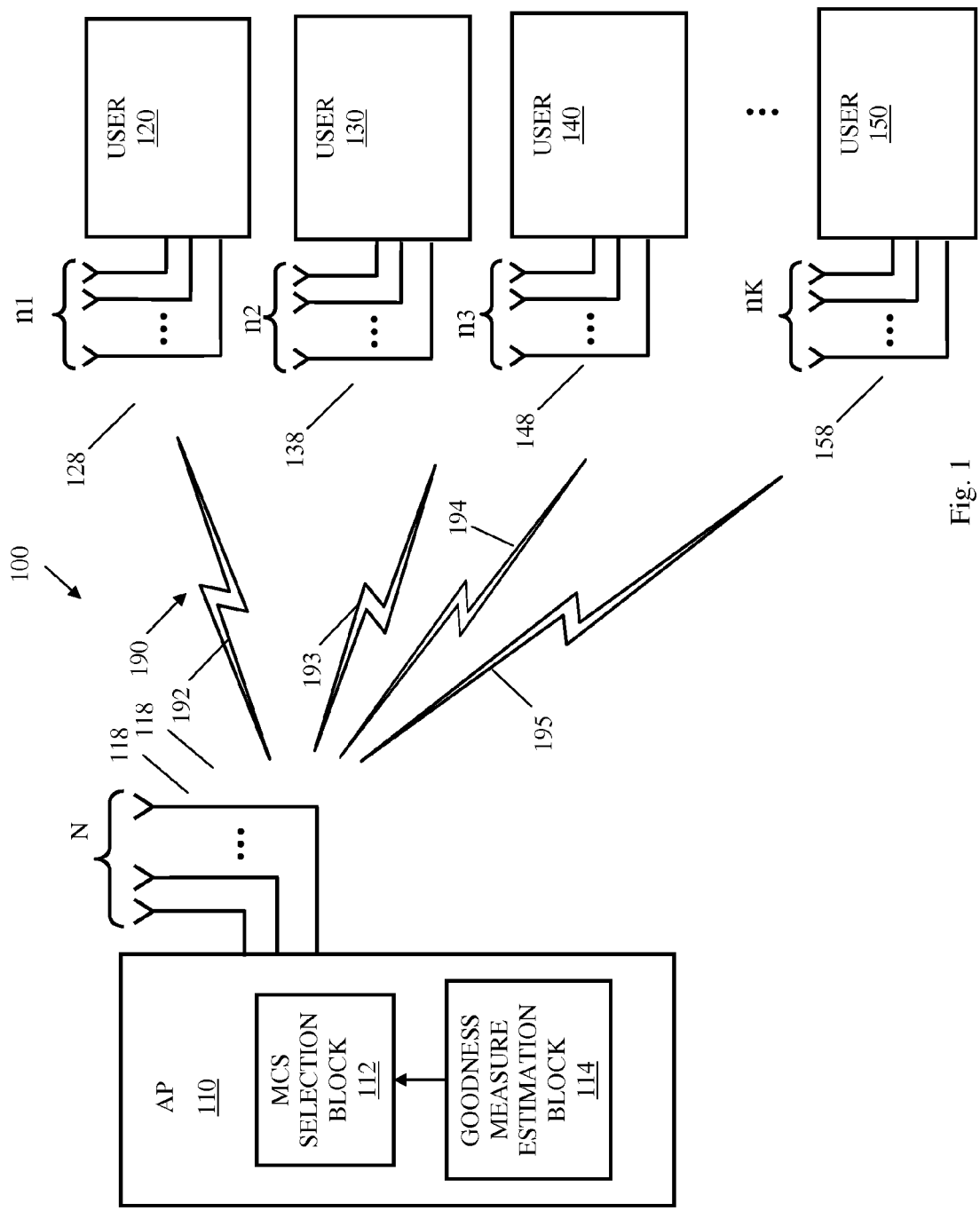
FIG. 1 schematically illustrates a module diagram of an MU MIMO wireless communication system according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the present invention are not limited in this regard, discussions utilizing terms such as, for example, "processing," "computing," "calculating," "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the present invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed at the same point in time.

It should be understood that the present invention may be used in a variety of applications. Although the present invention is not limited in this respect, the circuits and techniques disclosed herein may be used in many apparatuses such as personal computers, stations of a radio system, wireless communication system, digital communication system, satellite communication system, and the like.

Stations intended to be included within the scope of the present invention include, by way of example only, Wireless Local Area Network (WLAN) stations, Wireless Personal Area Network (WPAN) stations, two-way radio stations, digital system stations, analog system stations, cellular radio-telephone stations, and the like.

Types of WLAN communication systems intended to be within the scope of the present invention include, although are not limited to, "IEEE-Std 802.11, 1999 Edition (ISO/IEC 8802-11: 1999)" standard, and more particularly in "IEEE-Std 802.11b-1999 Supplement to 802.11-1999, Wireless LAN MAC and PHY specifications: Higher speed Physical Layer (PHY) extension in the 2.4 GHz band", "IEEE-Std 802.11a-1999, Higher speed Physical Layer (PHY) extension in the 5 GHz band" standard, "IEEE Std 802.11n-2009," IEEE 802.11ac standard (e.g., as described in "IEEE 802.11-09/0992r21") and the like.

Types of WLAN stations intended to be within the scope of the present invention include, although are not limited to, stations for receiving and transmitting spread spectrum signals such as, for example, Frequency Hopping Spread Spectrum (FHSS), Direct Sequence Spread Spectrum (DSSS), Orthogonal Frequency-Division Multiplexing (OFDM) and the like.

Devices, systems and methods incorporating aspects of embodiments of the invention are also suitable for computer communication network applications, for example, intranet and Internet applications. Embodiments of the invention may be implemented in conjunction with hardware and/or software adapted to interact with a computer communication network, for example, a Local Area Network (LAN), a Wide Area Network (WAN), or a global communication network, for example, the Internet.

An AP of a MU-MIMO communication system may calculate SINR of each stream of each user based on CSI received, for example, in a sounding exchange. The obtained SINR values may be used for choosing and tuning transmission parameters such as data rate, modulation and coding scheme (MCS), bandwidth, number of spatial streams, etc for each user. In practice, the AP has an estimation of CSI, and the calculated SINRs are therefore only estimated. Common and dominant sources for estimation errors of CSI are aging and noise where noise may include thermal noise, as well as quantization errors and errors due to subcarrier grouping in OFDM systems. Communication channels, and in particular wireless communication channels, change with time. The term aging relates to changes that may occur in the CSI with time. Typically, the estimated CSI available to the AP is updated relatively infrequently to avoid overheads. Between updates, the physical channel may diverge from its value at estimation time, and the estimated channel known to the AP becomes aged.

An error in the estimated SINRs may have two different effects, depending on the sign of the error. A negative error may result in the selection of transmission parameters that will result in data rates below the maximum possible rates. A positive error, on the other hand, may have the disastrous effect of very high PER, due to the selection of too high, unsupported, data rates. Obviously, a positive error in the estimated SINR should be avoided.

Unfortunately, the common method of taking a constant backoff on the estimated SINR is not suitable for multi-stream systems such as MU-MIMO systems. If the CSI estimation is inaccurate, then the interference term in the estimated SINR may erroneous, resulting in an unbounded error in the estimated SINR, which prohibits the use of a constant backoff. For example, in case there is interference and substantially no noise, then estimated SINR without interference may be very high or infinite, while any non-zero interference from other users may change estimated SINR dramatically.

Reference is now made to FIG. 1 which schematically illustrates a block diagram of an MU MIMO wireless communication system 100 in accordance with demonstrative embodiments of the present invention. It will be appreciated by those skilled in the art that the simplified components schematically illustrated in FIG. 1 are intended for demonstration purposes only, and that other components may be required for operation of the wireless devices. Those of skill in the art will further note that the connection between components in a wireless device need not necessarily be exactly as depicted in the schematic diagram.

MU MIMO wireless communication system 100 may include, for example, one or more wireless Access Points (APs), e.g., AP 110. AP 110 may have N transmit antennas 118, suitable, e.g., for SDMA transmission. System 100 may also include one or more users, e.g., users 120, 130, 140 and 150. Users 120, 130, 140 and 150 may have one or more radio frequency (RF) beamformee antennas 128, 138, 148 and 158, respectively, to receive transmissions from AP 110. Users 120-150 may participate in a next MU-MIMO transmission.

AP 110 and users 120, 130, 140 and 150 may be implemented using any suitable combination of memory, hardwired logic, and/or general-purpose or special-purpose processors, as is known in the art. Antennas 118, 128, 138, 148 and 158 may include, for example, an internal and/or external RF antennas, e.g., a dipole antenna, a monopole antenna, an end fed antenna, a circularly polarized antenna, a micro-strip antenna, a diversity antenna, an omnidirectional antenna, a semi-omnidirectional antenna, and/or any other type of antenna suitable for transmission and/or reception of radio frequency signals within a wireless communication network.

According to embodiments of the present invention, AP 110 may communicate with one or more of users 120, 130, 140 and 150 via one or more wireless communication channels 192, 193, 194 and 195. Wireless communication channels 192, 193, 194 and 195 may pertain to communication channel 190. AP 110 may transmit to one or more of users 120, 130, 140 and/or 150 via multiple antennas 118 using an SDMA transmission scheme. Users 120, 130, 140 and 150 may be adapted to SDMA operation or may operate according to legacy standards, e.g., IEEE 802.11n.

CSI may be presented in a channel matrix, a candidate transmit beamforming matrix, or in any other applicable form. For example, in explicit sounding exchange, AP 110 may send a sounding frame, for example, frame including LTF training symbols, to at least one of the users, for example user 130. User 130 may estimate its channel matrix by analyzing data found in the sounding frame. User 130 may send either its channel matrix, its candidate transmit beamforming matrix, e.g. the V matrix from the singular value decomposition (SVD) of the channel matrix, or any other applicable equivalent information, back to AP 110, for example, in a channel feedback frame. In implicit sounding, AP 110 may estimate the downlink, i.e. AP 110 to user 130 channel matrix from an uplink, i.e. user 130 to AP 110 frame reception and corresponding uplink channel estimate, assuming channel reciprocity.

It should be readily understood by these skilled in the art that user 130 may send and calculate CSI in any suitable modified or analogous form to the channel matrix. For example, user 130 may send back a candidate transmit (TX) beamforming matrix, together with a corresponding single-user (SU) SNR vector which conveys per-stream SU-SNR estimation. SU-SNR may relate to an SNR estimation relevant a single-user-multiple-input-multiple-output (SU-MIMO) scenario, assuming that AP 110 was calculating a beamforming matrix for a single user based on the feedback received from that user. The estimation of SNR of MU-MIMO systems may be different from SU-SNR since it may depend on a different beamforming matrix calculated based on feedback received from several uses. The candidate transmit beamforming matrix and the corresponding SU-SNR vector may be calculated based on the estimated channel matrix. For example, the candidate transmit beamforming matrix may be the V matrix from the SVD of the channel matrix $H=U \cdot D \cdot V^*$ sent in an uncompressed or compressed form. Sending the V matrix from the SVD of the channel matrix together with the SU-SNR vector is equivalent to sending the channel matrix. The SU-SNR vector may be equal to the squared diagonal of the D matrix in the SVD of the channel matrix. Since $D \cdot V^* = U^* \cdot H$, and both D and V, or equivalents, are fed back, the feedback may contain the channel matrix H, transformed by a unitary matrix U. Since the communication link may be agnostic to unitary transformations of the channel matrix, the unitary transformation by U is not significant. Thus, the actual channel matrix is effectively fed back.

AP 110 may include a goodness measure estimation block 114 and a modulation and coding scheme (MCS) selection block 112. MCS selection block 112 may receive a goodness measure estimation from goodness measure estimation block 114 and select a MCS that may enable maximal data rate for an allowed packet error rate (PER). Throughout the application, goodness measure may relate to any applicable parameter related to the quality of the channel, such as signal to noise ratio (SNR), signal to interference plus noise ratio (SINR), PER, etc.

Goodness measure estimation block 114 may estimate a goodness measure based on channel state information received, for example, in a channel sounding exchange.

According to embodiments of the present invention, goodness measure estimation block 114 may update the estimation of the goodness measure between channel sounding exchanges to account for aging and noise of the goodness measure. It should be noted that sounding exchange may involve significant overhead that may reduce useful bandwidth, or goodput. Therefore, frequent sounding exchanges are undesirable.

Let K denote the total number of users, where each user is denoted by an index $u \in \{1, K, K\}$ and let $h_u \in C^N$ denote a vector of channel coefficients between N AP antennas 118 and a single-antenna of a specific user u selected from users 120-150. Let $\hat{h}_u$ denote the estimation of channel coefficients $h_u$. $\hat{h}_u$ may become aged and noisy with time between estimations and thus may diverge from the real value of $h_u$. Let $\epsilon_u^{aging} \in C^N$ denote an aging-related error in $\hat{h}_u$, and $\epsilon_u^{noise} \in C^N$ denote an estimation noise in $\hat{h}_u$, thus:

$$\hat{h}_u = h_u + \epsilon_u^{aging} + \epsilon_u^{noise}. \quad (1)$$

For simplicity, embodiments of the present invention are presented for zero-forcing (ZF) method for calculation of transmit beamforming vectors. The ZF method may be highly vulnerable to channel estimation errors with relation to other beamforming methods. It should be noted that embodiments of the present invention are not limited to the ZF method for calculation of transmit beamforming vectors and that similar derivations can be done for other methods for calculation of transmit beamforming vectors, such as Minimum Mean Square Error (MMSE) method or such as iterative methods aimed to maximize the sum of mutual information, etc. MMSE method may account for both channel matrix and noise conditions, as opposed to ZF which may relay only on the channel matrix. Let $b_u \in C^N$ denote the complex conjugate of the normalized ZF transmit beamforming vector for user u. Normalized transmit beamforming may imply $|b_u|^2 = 1$, and $b_u^* \hat{h}_{u'} = 0$ for all $u \neq u'$. Let $p_u \in R_+$ denote the power allocated to user u, and $p_{tot} := \Sigma_u p_u$ denote the total transmission power allocated to all users. It should be noted that $b_u$ and $p_u$ may be calculated based on the channel estimations $\{\hat{h}_u\}$, as well as on the physical and/or regulatory power constraint $p_{reg\_tot}$. Typically $p_{tot} := \Sigma_u p_u$ may be equal to or smaller than $p_{reg\_tot}$.

In the case of a single antenna user and single subcarrier, the interference seen by user u due to transmit components intended for another user $u' \neq u$ is denoted by $I_{u' \to u}$, and may equal:

$$I_{u' \to u} = p_{u'} |b_{u'}^* h_u|^2. \quad (2)$$

The overall interference seen by user u is denoted by $I_u$ so that:

$$I_u = \Sigma_{u' \neq u} I_{u' \to u}. \quad (3)$$

Finally, $s_u$ denotes signal strength seen by user u, that is, $$s_u = p_u \cdot |b_u^* h_u|^2. \quad (4)$$

Throughout the application $s_u$, signal strength seen by user u, may be referred to as signal.

According to embodiments of the present invention, the interference seen by user u due to transmit components intended for another user $I_{u' \to u}$, considering the estimated channel coefficients $\hat{h}_u$, the aging error $\epsilon_u^{aging}$ and the estimation noise $\epsilon_u^{noise}$ may be estimated by:

$$I_{u' \to u} = p_{u'} |b_{u'}^* h_u|^2 \quad (5)$$
$$= p_{u'} |b_{u'}^* (\hat{h}_u - \epsilon_u^{aging} - \epsilon_u^{noise})|^2$$
$$= p_{u'} |b_{u'}^* (\epsilon_u^{aging} + \epsilon_u^{noise})|^2 \text{ (since } b_{u'}^* \hat{h}_u = 0)$$
$$= p_{u'} \left| \|\hat{h}_u\| \cdot \left( b_{u'}^* \frac{\epsilon_u^{aging}}{\|\epsilon_u^{aging}\|} \right) \cdot \frac{\|\epsilon_u^{aging}\|}{\|\hat{h}_u\|} + b_{u'}^* \cdot \epsilon_u^{noise} \right|^2$$

Let $$X_{aging} := \left( b_{u'}^* \frac{\epsilon_u^{aging}}{\|\epsilon_u^{aging}\|} \right) \cdot \frac{\|\epsilon_u^{aging}\|}{\|\hat{h}_u\|}, \quad (6)$$

and $$X_{noise} := b_{u'}^* \cdot \epsilon_u^{noise}. \quad (7)$$

Substituting (6) and (7) into (5), the estimated interference seen by user u due to transmit components intended for another user, $I_{u' \to u}$, may be given by:

$$I_{u' \to u} = p_{u'} \left| \|\hat{h}_u\| \cdot X_{aging} + X_{noise} \right|^2 \quad (8)$$
$$= p_{u'} \|\hat{h}_u\|^2 \cdot |X_{aging}|^2 + p_{u'} |X_{noise}|^2 + 2 p_{u'} \|\hat{h}_u\| \Re$$
$$(X_{aging}^* X_{noise})$$
$$= p_{u'} \|\hat{h}_u\|^2 \cdot |X_{aging}|^2 + p_{u'} |X_{noise}|^2 + 2 p_{u'} \|\hat{h}_u\| \cdot$$
$$|X_{aging}| \cdot |X_{noise}| \Re \left( \frac{X_{aging}^*}{|X_{aging}|} \frac{X_{noise}}{|X_{noise}|} \right),$$

Where $\Re(\ldots)$ denotes an operator of taking the Real part of a complex value, $\|\hat{h}_u\|$ is the estimated channel magnitude and $\|\hat{h}_u\|^2$ is the estimated squared channel magnitude.

According to embodiments of the present invention values of $X_{aging}$ and $X_{noise}$ may be substantially unknown to AP 110 and may not be estimated based on available information of estimated channel vectors. For example, the term $$b_{u'}^* \frac{\epsilon_u^{aging}}{\|\epsilon_u^{aging}\|}$$

of $X_{aging}$ may be seen as Hermitian product of the unit vector $b_{u'}$ which may be derived from the estimated channel, and the term $\epsilon_u^{aging}/\|\epsilon_u^{aging}\|$ which may be seen as a "random direction vector". It may be assumed that the "direction of aging error" may be uniformly distributed over the unit sphere and substantially independent of the estimated channels, as opposed to the aging error itself, that is dependent on the channel. Therefore the product $$b_{u'}^* \frac{\epsilon_u^{aging}}{\|\epsilon_u^{aging}\|}$$

may be substantially independent of the estimated channels. The term $$\frac{\|\epsilon_u^{aging}\|}{\|\hat{h}_u\|}$$

of $X_{aging}$ may be seen as the percentage of magnitude change due to aging. It may be assumed that the term $$\frac{\|\epsilon_u^{aging}\|}{\|\hat{h}_u\|}$$

is substantially independent of the estimated channels. Thus, $X_{aging}$ may be substantially unknown given the available information to AP 110, that is the estimated channels $\hat{h}_u$ for $u \in \{1, K, K\}$.

Additionally, while there may be some statistical dependence between $X_{noise} = b_u{'}^* \cdot \epsilon_u^{noise}$ and the estimated channels, $X_{noise}$ may not be predicted from the estimated channels $\hat{h}_u$ for $u \in \{1, K, K\}$.

Thus, according to embodiments of the present invention, neither $X_{aging}$ nor $X_{noise}$ may be predicted or estimated from the data available to AP 110, that is, the estimated channels $\hat{h}_u$ for $u \in \{1, K, K\}$. In some embodiments of the present invention the random variables $|X_{aging}|^2$ and $|X_{noise}|^2$ in (8), related to the magnitude, that is, the variance of $X_{aging}$ and $X_{noise}$, respectively, may be approximated by error coefficients $x_{aging}$ and $x_{noise}$, respectively. Error coefficients $x_{aging}$ and $x_{noise}$, may be deterministic non-negative constants. Throughout this application, $x_{aging}$ and $x_{noise}$ are referred to as the aging coefficient and the noise coefficient, respectively.

In some embodiments of the present invention, $x_{aging}$ and $x_{noise}$ may be estimated by simulation. For example, cumulative distribution functions (CDFs) of $|X_{aging}|^2$ and $|X_{noise}|^2$ may be found by simulation. A value for $x_{aging}$ may be chosen so that the probability that the simulated random variable $|X_{aging}|^2$ is larger than the approximating constant $x_{aging}$ is small. Similarly, a value for $x_{noise}$ may be chosen so that the probability that the simulated random variable $|X_{noise}|^2$ is larger than the approximating constant $x_{noise}$ is small. For example, an $x_{aging}$ for which $\Pr(|X_{aging}|^2 \geq x_{aging}) < \delta$ and $x_{noise}$ for which $\Pr(|X_{noise}|^2 \geq x_{noise}) < \delta$ for some small $\delta$ may be chosen, where Pr denotes probability.

The simulation may include representing the physical channel by a channel model, the physical noise by pseudo-random noise, etc. and performing user and AP calculations. The user and AP calculations may include noisy channel sounding, TX beamforming calculation at the AP based on delayed sounding, etc. The statistics of random variables $|X_{aging}|^2$ and $|X_{noise}|^2$ may be recorded. For example, the statistics of random variables $|X_{aging}|^2$ and $|X_{noise}|^2$ may be recorded for several aging values, e.g., 10, 20, and 40 mSec. Values for $x_{aging}$ and $x_{noise}$ may be chosen based on the stored statistics. Additionally or alternatively, $x_{aging}$ and $x_{noise}$ may be estimated by experiment. Several values for $x_{aging}$ and $x_{noise}$ may be chosen for several aging values, e.g., 10, 20, and 40 mSec.

Substituting $x_{aging}$ and $x_{noise}$ into (8) may give:

$$I_{u' \to u} \approx p_{u'}(\|\hat{h}_u\|^2 x_{aging} + x_{noise} + 2y\|\hat{h}_u\|\sqrt{x_{aging} \cdot x_{noise}}), \quad (9)$$

Where the error coefficient y, referred to as the cross coefficient, may be a deterministic coefficient used to approximate the expression:

$$Y := \Re\left(\frac{X_{aging}^*}{|X_{aging}|} \frac{X_{noise}}{|X_{noise}|}\right) \quad (9.1)$$

on the right-hand side of (8). Since Y is a real part of a unit magnitude complex random variable, y may take values in the range of $[-1, 1]$. The cross coefficient y may be approximated by simulation or experiment, as described hereinabove for $x_{aging}$ and $x_{noise}$. Alternatively, in some embodiments of the present invention, the cross coefficient y may set to zero, y=0, or to 1, y=1, or to any other predetermined value in order to minimize the number of optimized parameters.

Summing the estimated interference form other users pertaining to the MU-MIMO communication system, the overall estimated interference seen by user u, $I_u$ may be given by:

$$I_u = \sum_{u' \neq u} I_{u' \to u} \quad (10)$$

$$\approx \left(\sum_{u' \neq u} p_{u'}\right) \cdot \left(\|\hat{h}_u\|^2 x_{aging} + x_{noise} + 2y\|\hat{h}_u\|\sqrt{x_{aging} \cdot x_{noise}}\right),$$

$$= (p_{tot} - p_u) \cdot \left(\|\hat{h}_u\|^2 x_{aging} + x_{noise} + 2y\|\hat{h}_u\|\sqrt{x_{aging} \cdot x_{noise}}\right)$$

For simplicity of the mathematical formulation and representation it may be assumed that degradation in estimated SINR is mainly due to the introduced interference, and the change in the received power strength is negligible, hence for all $u \in \{1, K, K\}$:

$$|b_u^* h_u|^2 \approx |b_u^* \hat{h}_u|^2, \quad (11)$$

It should be readily understood by these skilled in the art that this assumption does not limit the scope of the current invention, and that any degradation in estimated SINR due to a changes in the received power may be taken into account by, for example, a constant backoff on the signal value found at the numerator of SINR.

Let $\gamma_u^{aging+noise} := s_u / I_u$ be the signal-to-interference ratio due to the two sources of estimation errors, the aging error $\epsilon_u^{aging}$ and the estimation noise $\epsilon_u^{noise}$. Then based on (11):

$$(\gamma_u^{aging+noise})^{-1} \approx \frac{(p_{tot} - p_u) \cdot \left(\|\hat{h}_u\|^2 x_{aging} + x_{noise} + 2y\|\hat{h}_u\|\sqrt{x_{aging} \cdot x_{noise}}\right)}{p_u |b_u^* h_u|^2}$$

$$\approx \frac{(p_{tot} - p_u) \cdot \left(\|\hat{h}_u\|^2 x_{aging} + x_{noise} + 2y\|\hat{h}_u\|\sqrt{x_{aging} \cdot x_{noise}}\right)}{p_u |b_u^* \hat{h}_u|^2}$$

$$=: (\hat{\gamma}_u^{aging+noise})^{-1}, \quad (12)$$

Where $p_u |b_u^* \hat{h}_u|^2$ may substantially equal the signal. Let $\hat{\gamma}_u^{no-err.}$ be the estimated signal-to-noise ratio (SNR) without channel estimation errors, that is:

$$(\hat{\gamma}_u^{no-err.})^{-1} := \frac{\sigma^2}{p_u |b_u^* \hat{h}_u|^2}, \quad (13)$$

where $\sigma^2$ is the noise variance of user u. These $\sigma^2$ may depend on user u, since $\sigma^2$ is affected by the noise-figure of user u, the algorithm used for channel estimation in user u, e.g., with/without smoothing, as well as on the ambient interference seen by user u. Typically, AP 110 should have some assumption regarding the noise variance of users 120-150.

Combining (12) and (13), the overall estimated SINR $\gamma_u$ of user u may be calculated by:

$$\gamma_u^{-1} = \frac{\text{interference} + \sigma^2}{\text{signal}} \quad (14)$$

$$\approx \frac{(p_{tot} - p_u) \cdot \left( \|\hat{h}_u\|^2 x_{aging} + x_{noise} + 2y\|\hat{h}_u\|\sqrt{x_{aging} \cdot x_{noise}} \right) + \sigma^2}{p_u |b_u^* \hat{h}_u|^2}$$

$$= (\hat{\gamma}_u^{aging+noise})^{-1} + (\hat{\gamma}_u^{no-err.})^{-1}.$$

Since $\hat{h}_u$ is known, $b_u$, $p_u$, and $p_{tot}$ may all be derived from $\hat{h}_u$, and $x_{aging}$, $x_{noise}$ and y may be predetermined or calculated based on information available to AP 110, Equation (14) may depend only on information available to AP 110 and therefore may be used to approximate $\gamma_u$ and eventually to select the transmission rate and MCS.

The estimated interference may include an ageing term. The aging term may relate or equal the power of the other users multiplied by the estimated squared channel magnitude, scaled by a first coefficient. For example, in equation 14, the term ($p_{tot}-p_u$) represents the power allocated to the other users, $\|\hat{h}_u\|^2$ represents the estimated squared channel magnitude, and the first coefficient is the aging coefficient $x_{aging}$.

The estimated interference may include a noise term. The noise term may relate or equal the power of the other users, scaled by a second coefficient. For example, in equation 14, the term ($p_{tot}-p_u$) represents the power allocated to the other users, and the second coefficient is the noise coefficient $x_{noise}$.

The estimated interference may include a cross term. The cross term may relate or equal the power of the other users multiplied by the estimated channel magnitude, scaled by a third coefficient. For example, in equation 14, the term ($p_{tot}-p_u$) represents the power allocated to the other users, $\|\hat{h}_u\|$ represents the estimated squared channel magnitude, and the coefficient is $2y\sqrt{x_{aging} \cdot x_{noise}}$ where y is the cross coefficient. It should be noted that other forms of third coefficients may be used, and that the third coefficient may not depend on $x_{aging}$ and $x_{noise}$. In addition, while the formulation presented herein above may present a possible physical rational for estimating the interference using the ageing term the noise term and the cross term, these coefficients may be selected indecently from their physical meaning, for example, using a simulation or experiments to evaluate the interference and performing polynomial curve fitting. In addition embodiments of the present invention are not limited to second order polynomials and higher ranks may be used. In addition, according to embodiments of the present invention, some of the coefficients may equal zero.

Figure 2:
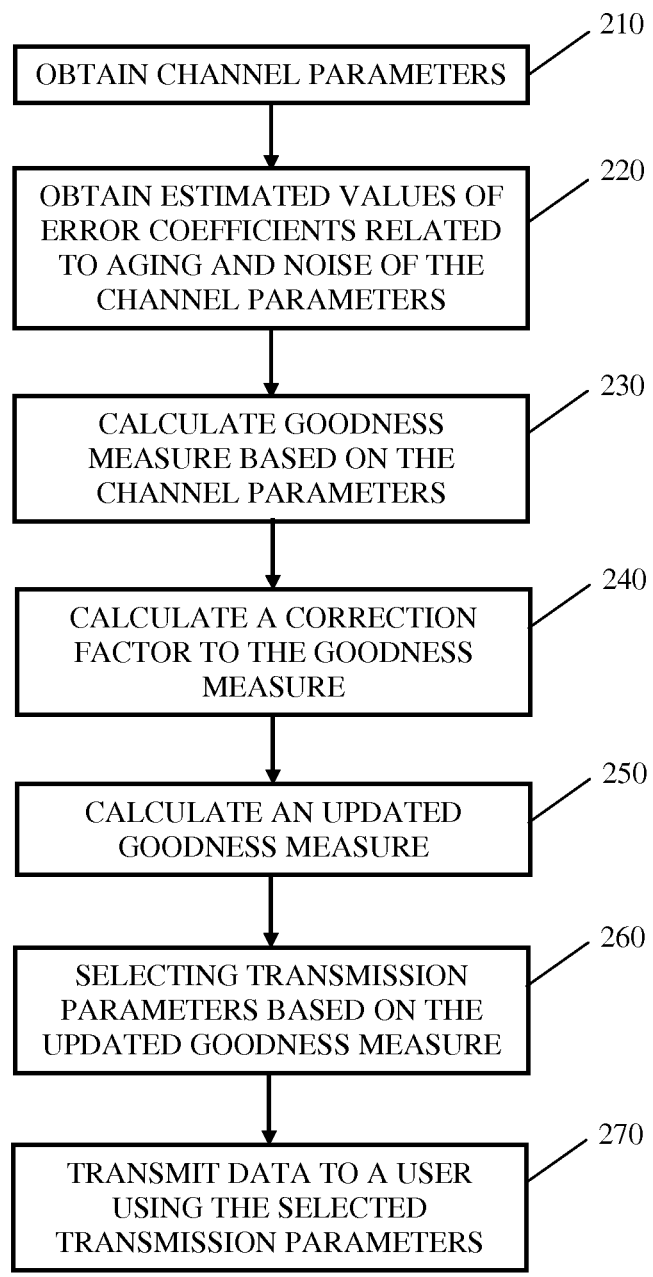
FIG. 2 is a flowchart illustration of a method for estimation of an updated goodness measure for MU MIMO communication systems according to embodiments of the present invention.

Reference is now made to FIG. 2 which is a flowchart illustration of a method for tuning transmission parameters based on estimation of an updated goodness measure for MU MIMO communication systems according to embodiments of the present invention. According to embodiments of the present invention, estimation of updated goodness measure may be performed at AP 110, for example, in goodness measure estimation block 114.

In block 210 CSI related to channel 190 from AP 110 to users 120-150, may be obtained. Typically CSI related to a channel from AP 110 to the users of MU-MIMU communication system 100 that participate in a next MU-MIMO transmission may be obtained. CSI may be obtained in any applicable format. For example, CSI may be obtained in the form of channel coefficients $h_u$, e.g., in the form of channel matrix or a vector of channel coefficients in case of a single antenna user, or in the form of D and V parts of the SVD of the estimated channel, or equivalents. CSI may be obtained explicitly or implicitly. In block 220 estimated values of error coefficients are obtained. The error coefficients may relate to channel-ageing and to estimation noise of the CSI. The error coefficients may be constants, predetermined using simulations or experimental measurements. Additionally or alternatively, the error coefficients may be tracked dynamically based on related parameters measured by system 100. In block 230, a selected goodness measure may be calculated based on the CSI and on other parameters known to AP 110. For example, the goodness measure may be a ratio between signal to noise, also referred to as signal to noise ratio (SNR), packet error rate (PER) or any other applicable goodness measure. In block 240 a correction factor to the goodness measure may be calculated. For example, in case the goodness measure is SNR, the correction factor may relate to a ration between an estimated interference to the signal. The correction factor may be related, for example, to the power allocated to other users, the CSI and the error coefficients. In block 250 an updated goodness measure may be calculated. For example, in case the goodness measure is SNR, the updated goodness measure may be a ratio between a signal to an estimated interference plus noise also referred to as SINR. The updated goodness measure may be a function of the goodness measure and the correction factor. It should be readily understood that blocks 230 and 240 may be optional and that the updated goodness measure may be calculated in block 250 directly for example, from power allocated to other users, the CSI, the estimated channel magnitude derived from the CSI, the error coefficients, and other parameters as needed. In block 260, the updated goodness measure may be used, for example, for the selection of transmission parameters such as data rate, MCS etc. in block 270, data may be transmitted to a user using the selected transmission parameters. It should be readily understood by those skilled in the art that the updated goodness measure may be used for various other purposes, such as scheduling.

Figure 3:
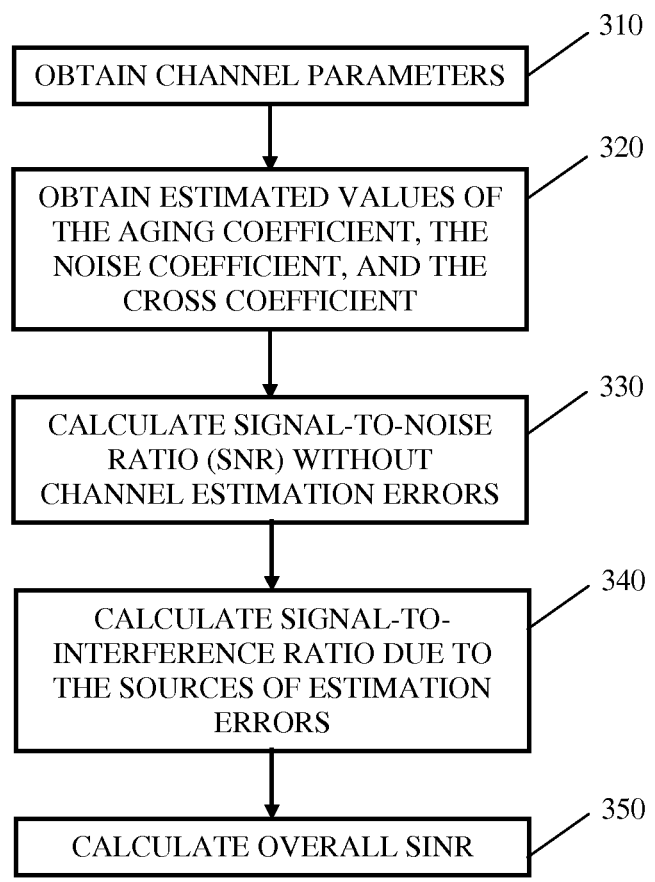
FIG. 3 is a flowchart illustration of an aging and noise coefficient (ANC) method for SINR estimation for MU MIMO communication systems with a single antenna users and a single subcarrier or a white channel, according to embodiments of the present invention.

Reference is now made to FIG. 3 which is a flowchart illustration of an aging and noise coefficient (ANC) method for SINR estimation for MU MIMO communication systems with single antenna users and a single subcarrier or a white channel, according to embodiments of the present invention. The term white channel may relate to a channel in which transmission is performed over a plurality of subcarriers and the CSI is substantially the same for all the subcarriers. According to embodiments of the present invention, the ANC method for SINR estimation described hereinbelow with reference to FIG. 3 may be suitable to MU MIMO communication systems with single subcarrier or a substantially white channel. According to embodiments of the present invention, estimation of SINR may be performed at AP 110, for example, in goodness measure estimation block 114. The method for SINR estimation may be seen as an example for the method for estimation of an updated goodness measure described with relation to FIG. 2, in which the CSI may be the channel coefficients, such as $\hat{h}_u$, the error coefficients may be $x_{aging}$, $x_{noise}$ and y, the selected goodness measure may be signal-to-noise ratio (SNR), the correction factor to the goodness measure may be signal-to-interference ratio, and the updated goodness measure may be estimated SINR.

In block 310 CSI may be obtained. For example, CSI may be obtained in an explicit or implicit sounding exchange from users that participate in a next MU-MIMO transmission. CSI may be obtained in any applicable format. For example, CSI may be obtained in the form of channel matrix, a vector of channel coefficients in case of a single antenna user, or in the form of D and V parts of the SVD of the estimated channel, or equivalents. CSI may be obtained explicitly or implicitly. For example, $\hat{h}_u$ may be obtained in block 310. In block 320, estimated values of error coefficients $x_{aging}$, $x_{noise}$ and y may be obtained. As mentioned before, $x_{aging}$, $x_{noise}$ and y may be predetermined in a simulation and/or experiments performed offline. Alternatively or in addition, the error coefficients may be estimated during operation based on data received from users, as will be discussed infra. In block 330, an estimated signal-to-noise ratio (SNR) substantially without channel estimation errors $\hat{\gamma}_u^{no-err.}$ may be calculated according to (13). In block 340 the signal-to-interference ratio, $\gamma_u^{aging+noise}$ may be calculated according to (12). As seen in (12) the signal-to-interference ratio is a function of the error coefficients $x_{aging}$, $x_{noise}$ and y, as well as the channel coefficients $\hat{h}_u$, $p_{tot}$ and other parameters derived from $\hat{h}_u$. The overall estimated SINR, $\gamma_u$, of user u may be calculated using (14) in block 350. The overall estimated SINR, $\gamma_u$, of user u may be used, for example, for the selection of MCS of user u. It should be readily understood that blocks 330 and 340 may be optional and that the overall estimated SINR, $\gamma_u$, of user u may be calculated in block 350 directly from the channel coefficients, $\hat{h}_u$, $p_{tot}$ and other parameters derived from $\hat{h}_u$ using (14).

Figure 4:
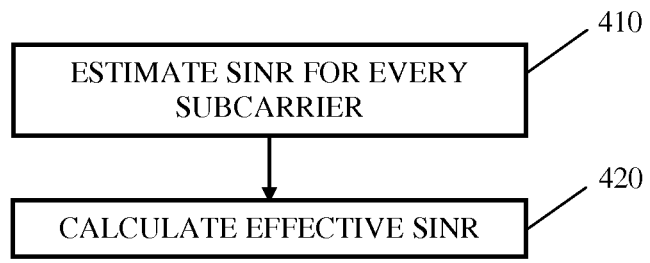
FIG. 4 is a flowchart illustration of a per-subcarrier ANC method for SINR estimation for multi carrier MU MIMO communication systems with single antenna users according to embodiments of the present invention.

Reference is now made to FIG. 4 which is a flowchart illustration of a per-subcarrier ANC method for SINR estimation for multi carrier MU MIMO communication systems with single antenna users according to embodiments of the present invention. According to embodiments of the present invention, per-subcarrier SINR estimation may be performed at AP 110, for example, in goodness measure estimation block 114. It should be noted that per-subcarrier ANC method for SINR estimation described hereinbelow may be used with multiple antenna users, however this method may be less optimal than other method suitable for multiple antenna users described infra.

In block 410, estimation of SINR may be repeated for each subcarrier f to get a per-subcarrier vector of estimated SINRs, denoted $\{\hat{\gamma}_{u,f}\}_f$. For example, estimation of SINR as described with relation to blocks 310-350 of FIG. 3 may be repeated for substantially each subcarrier f. In block 420 a single estimated effective SINR, $\hat{\gamma}_{u,eff}$ may be calculated from the vector of estimated SINRs, $\{\hat{\gamma}_{u,f}\}_f$, for example, by an effective SINR calculator. Throughout the present application the term effective SINR is related to the output of a method for converting an SINR vector to a single equivalent SINR. Similarly the term effective SNR is related to the output of a method for converting an SNR vector to a single equivalent SNR. Such conversions may be performed by an effective SINR/SNR calculator using any applicable method, e.g., simple arithmetic or geometric averaging, or by averaging exponentials and taking logarithm as in the exponential effective SNR method (EESM), in which a vector $\{\gamma_i\}_{i=1}^N$ of SINRs is converted into a single effective SINR $\gamma^{eff}$ by the formula $$\gamma^{eff} = -\beta \ln\left(\frac{1}{N}\sum_{i=1}^{N}\exp\left(-\frac{\gamma_i}{\beta}\right)\right),$$

where $\beta$ is an MCS-dependent parameter, etc. The effective SINR, $\hat{\gamma}_{u,eff}$ may be used to select the data rate or MCS of the multi carrier communication system.

It should be noted that for some effective SINR calculation methods, such as the EESM, the same vector of per-subcarrier SINRs may result in different effective SINRs for different data rates or MCSs. This rate-dependency may be accounted for by calculating the effective SINR $\hat{\gamma}_{u,eff}(r)$ related to $\{\hat{\gamma}_{u,f}\}_f$ for each supported data rate r and selecting the highest data rate r for which $\hat{\gamma}_{u,eff}(r)$ guarantees a low enough PER. Alternatively, other rate-scanning methods for a fixed SINR vector may be used. For example, a scan may start at the highest possible data rate, and continue to the second highest data rate if the effective SINR for the highest data rate is too low for the target PER, and so on, until the highest data rate for which the effective SINR is high enough for the target PER is found. Typically, when using this scanning method, the effective SINR may be calculated for only part of the data rates, which may be more efficient then calculating effective SINRs for all data rates.

As mentioned hereinabove, CSI may be obtained in any applicable format. For example, according to IEEE 802.11ac standard in MU-MIMO mode, following an explicit sounding frame from AP 110, each user u may return to AP 110 equivalents of the SVD of the estimated channel per-subcarrier. In detail, if $\tilde{H}_{u,f} = u_{u,f} D_{u,f} V_{u,f}^*$ is an SVD of the channel estimated by user u at subcarrier f, then the returned information from user u to AP 110 may be equivalent to the families $\{D_{u,f}\}_f$, $\{V_{u,f}\}_f$ of all D's and all V's over all subcarriers, or. For example, according to IEEE 802.11ac a user may return a compressed representation of V, from which V may be reconstructed using a known formula. Instead of D, which may relate to the magnitude of the effective channel, the user may return estimated SNR, which may relate to the squared magnitude of the effective channel divided by the noise variance. If AP 110 has an estimate of the noise variance, AP 110 may derive D from the returned estimated SNR. For example, the user may return the products $\{D_{u,f} V_{u,f}^*\}_f$, which are equal to the channel up to a unitary transformation at the receiver side. Since the receiver may typically compensate for this lack of unitary transformation, the returned products are typically equivalent to the actual channel matrices.

In case users 120-150 have a single antenna then $\tilde{H}_{u,f} = \tilde{h}_{u,f} \in \mathbb{C}^{1 \times N}$ where N is the number of AP antennas 118, and $D_{u,f}$ may be a non-negative scalar, 1-by-1 matrix, $d_{u,f}$ satisfying $d_{u,f} = \|\tilde{h}_{u,f}\|$. It should be noted that $d_{u,f}$ may typically be estimated while AP 110 is transmitting data using known sounding power $\tilde{p}_f$ at subcarrier f. Writing $h_{u,f}$ for the antenna-to-antenna physical channel of user u at subcarrier f, it follows that $d_{u,f}^2$ may be an estimation of $\tilde{p}_f \|h_{u,f}\|^2$ rather than of $\|h_{u,f}\|^2$ itself.

Thus, whenever Equations (12)-(14) are used for subcarrier f, $d_{u,f}/\sqrt{\tilde{p}_f}$ may substitute $\|\hat{h}_u\|$. AP 110 may know power levels $\tilde{p}_f$ used during sounding, as well as the power levels $p_{u,f}$ assigned to each user u at each subcarrier f during data transmission.

Since in the case of users with a single antenna, $U_{u,f}$ may be a complex number of unit magnitude, occurrences of $|b_u^* \hat{h}_u|^2$ in Equations (12)-(14) may be replaced by $(d_{u,f}^2/\tilde{p}_f) \cdot |v_{u,f}^* b_{u,f}|^2$, where $v_{u,f} = V_{u,f}$, a column vector in case of users with a single antenna, and $b_{u,f}$ may be a beamforming vector of user u at subcarrier f, without complex conjugation, as opposed to $b_u$ in case $\hat{h}_u$ is obtained.

Apart from the above considered quantities and the coefficients $x_{aging}$, $x_{noise}$ and y, Equations (12)-(14) refer also to the noise variance at the side of user u, $\sigma^2$, which in a multi-carrier system may be denoted, $\sigma_{u,f}^2$, emphasizing its possible dependency on the user and the subcarrier. Noise variances $\sigma_{u,f}^2$ across users and subcarriers depend strongly on the users, since they are affected by the user noise-figure, the algorithm used for channel estimation in the user e.g., with/without smoothing, as well as on the ambient interference seen by the user. AP 110 may have some assumptions regarding noise variances $\sigma_{u,f}^2$. Typically, the $\sigma_{u,f}^2$ may depend on the user, but not on the subcarrier. For example, according to some embodiments of the present invention, AP 110 may obtain noise variances $\sigma_{u,f}^2$ of users 120-150 from the users. Additionally or alternatively, AP 110 may assume typical values, based on typical RF implementations, or AP 110 may assume that the noise variance $\sigma_{u,f}^2$ of users 120-150 is similar to the noise variance of AP 110.

Thus, according to embodiments of the present invention, the method for SINR estimation described with relation to FIG. 3 and the method for per-subcarrier SINR estimation for multi carrier communication systems described with relation to FIG. 4 may be adapted for the case of single-antenna users within the IEEE 802.11ac MU-MIMO framework as described herein below. In block 310 AP 110 may send a sounding frame to substantially all users and may obtain an explicit feedback frame from substantially each user in return. The feedback frame may contain CSI in the form of or equivalent to the families $\{d_{u,f}\}_f$, $\{v_{u,f}\}_f$ all D's and all V's of the SVD of the channel or of one singular mode out of all D's and all V's of the SVD of the channel, the products $\{d_{u,f} v_{u,f}^*\}_f$ of all D's and all V's of the SVD of the channel, or equivalents thereof. This CSI feedback may be used to calculate the normalized TX beamforming vectors $\{b_{u,f}\}$ user u at subcarrier f, as well as the per-user, per-subcarrier power levels $\{p_{u,f}\}$ user u at subcarrier f.

For each subcarrier f, blocks 330-350 may be repeated with Equations (12)-(14) undergoing the following adaptations: $d_{u,f}\sqrt{\tilde{p}_f}$ equals the estimated channel magnitude of user u at subcarrier f, and may substitute $\|\hat{h}_{u,f}\|$ where $\tilde{p}_f$ is the transmission power during sounding at subcarrier f, $(d_{u,f}\sqrt{\tilde{p}_f})^2$ is the estimated squared channel magnitude of the user u at the subcarrier f, $(d_{u,f}^2/\tilde{p}_f)\cdot|v_{u,f}^* b_{u,f}|^2$ may substitute $|b_u^* h_u|^2$ and thus $p_u(d_{u,f}^2/\tilde{p}_f)\cdot|v_{u,f}^* b_{u,f}|^2)$ may be the signal of user u at subcarrier f, $\sigma_{u,f}^2$, the noise variance of user u at subcarrier f may substitute $\sigma^2$, $p_{u,f}$ the power used during data transmission for user u at subcarrier f may substitute $p_u$, and $p_{tot,f}$ the total power at subcarrier f may substitute $p_{tot}$.

Explicitly, Equations (12)-(14) now read (respectively):

$$(\hat{\gamma}_{u,f}^{aging+noise})^{-1} := \qquad (17)$$

$$\frac{(p_{tot,f} - p_{u,f}) \cdot \left(d_{u,f}^2 x_{aging} + x_{noise} \cdot \tilde{p}_f + 2y \cdot \sqrt{\tilde{p}_f} \cdot d_{u,f}\sqrt{x_{aging} \cdot x_{noise}}\right)}{p_{u,f} \cdot d_{u,f}^2 \cdot |v_{u,f}^* b_{u,f}|^2},$$

$$(\hat{\gamma}_{u,f}^{no-err})^{-1} := \frac{\tilde{p}_f \cdot \sigma_{u,f}^2}{p_{u,f} \cdot d_{u,f}^2 |v_{u,f}^* b_{u,f}|^2}, \qquad (18)$$

and $$(\hat{\gamma}_{u,f})^{-1} := (\hat{\gamma}_{u,f}^{aging+noise})^{-1} + (\hat{\gamma}_{u,f}^{no-err})^{-1}. \qquad (19)$$

where $(p_{tot,f} - p_{u,f})$ substantially equals the power allocated to the other users at subcarrier f and $p_{u,f}$ and $b_{u,f}$ are derived from the CSI.

It should be noted that according to IEEE 802.11ac multi-carrier case, $X_{aging}$, $X_{noise}$ and Y of Equations (6), (7) and (9.1) may be replaced by per-subcarrier counterparts, $X_{aging,f}$, $X_{noise,f}$ and $Y_f$ that may be expressed as $$X_{aging,f} := \left(b_{u',f}^* \frac{\varepsilon_{u,f}^{aging}}{\|\varepsilon_{u,f}^{aging}\|}\right) \cdot \frac{\|\varepsilon_{u,f}^{aging}\|}{\|\hat{h}_{u,f}\|}, \qquad (19.1)$$

$$X_{noise,f} := b_{u',f}^* \cdot \varepsilon_{u,f}^{noise} \qquad (19.2)$$

and $$Y_f := \Re\left(\frac{X_{aging,f}^*}{|X_{aging,f}|} \frac{X_{noise,f}}{|X_{noise,f}|}\right) \qquad (19.3)$$

Here $\varepsilon_{u,f}^{aging}$ denotes the aging-related error in $h_{u,f}$ and $\varepsilon_{u,f}^{noise}$ denotes the estimation noise in $h_{u,f}$ per-user u and per-subcarrier f. However, despite having a different random variable $X_{aging,f}$ for each subcarrier, it is expected that these variables may have substantially the same statistics, and so a single aging coefficient $x_{aging}$ may be suitable for all subcarriers. Similarly, a single $x_{noise}$ and a single y may be used for all subcarriers.

Block 410 of FIG. 4 may result in a per-subcarrier vector of estimated SINRs for substantially each user u. in block 420 this vector may be unified e.g., using an effective SNR method, to get a single SINR estimation per-user. The single estimated SINR of each user may then be used for rate and MCS selection for that user.

Figure 5:
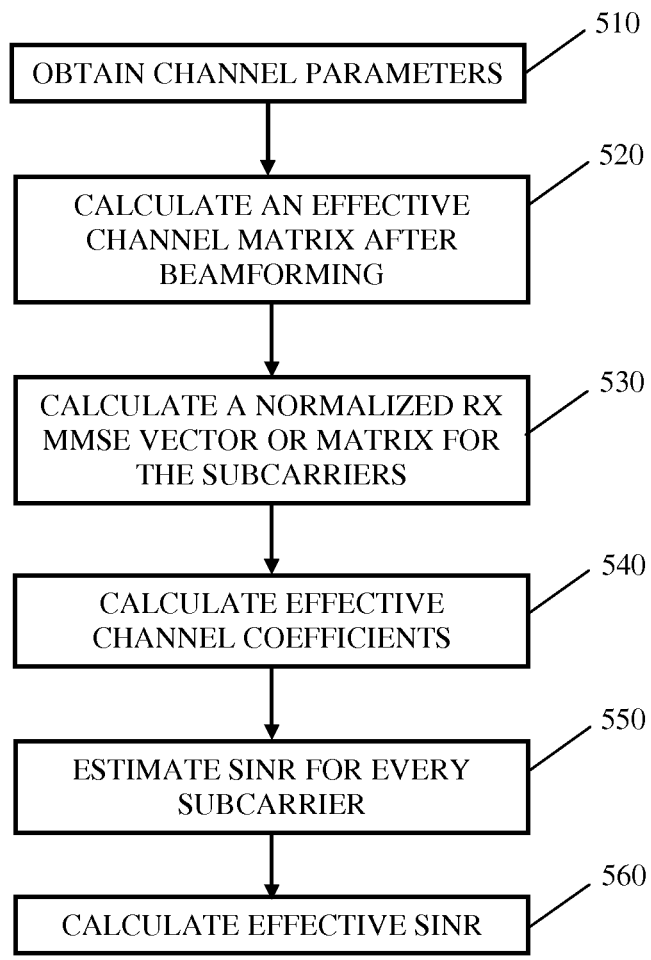
FIG. 5 is a flowchart illustration of a per-subcarrier ANC method for effective SINR estimation for multi carrier MU MIMO communication systems in which users may have multiple antennas, according to embodiments of the present invention.

Reference is now made to FIG. 5 which is a flowchart illustration of a per-subcarrier ANC method for effective SINR estimation for multi carrier MU MIMO communication systems in which users may have a plurality of antennas, according to embodiments of the present invention. According to embodiments of the present invention, effective SINR estimation in case of multiple antenna users may be performed at AP 110, for example, in goodness measure estimation block 114.

For example, in case the users may have a plurality of antennas but are receiving a single stream, the multi-antenna—single stream case, users 120-150 may typically use their extra antennas to perform interference cancellation, assuming resolvable long training fields (LTFs) transmission. For example, for a linear receiver, interference cancellation amounts to letting the receive (RX) beamforming vector be one row of an MMSE matrix considering substantially all streams of substantially all users. It should be noted that embodiments of the present invention are not limited to a specific beamforming method at the receiver side and that beamforming methods other than MMSE may be used.

According to embodiments of the present invention, knowing the D's and the V's from the SVD of the channels, or equivalents, may suffice for effective SINR estimation. For example, user u may precede the calculation of the MMSE receive (RX) matrix by multiplying the RX signal by $U_{u,f}^*$. This multiplication by a unitary matrix may be linear and invertible, and therefore composing it with an MMSE matrix for the new channel may give an MMSE matrix for the original channel.

In the multi-antenna—single stream case CSI may be obtained in block 510. For example, according to IEEE 802.11ac standard in MU-MIMO mode, following an explicit sounding frame from AP 110, user u as well as other users that participate in a next MU-MIMO transmission may return to AP 110 CSI in any applicable form such as, estimated full matrices $\{\hat{H}_{u,f}\}$, estimated products $\{D_{u,f} V_{u,f}^*\}$, or two separate families $\{\hat{D}_{u,f}\}$, $\{\hat{V}_{u,f}^*\}$ or equivalents to the "D" and "V" parts of the SVD of the estimated channel per-subcarrier. In detail, if $\tilde{H}_{u,f} = U_{u,f} D_{u,f} V_{u,f}^*$ is an SVD of the channel estimated by user u at subcarrier f, then the returned information from that user to AP 110 may be equivalent to the families $\{D_{u,f}\}_f$, $\{V_{u,f}\}_f$ of all D's and all V's over all subcarriers.

In block 520 an effective channel matrix after transmit (TX) beamforming $T_{u,f}$ is calculated according to:

$$T_{u,f} := \tilde{p}_f^{-1/2} \cdot D_{u,f} V_{u,f}^* B_f, \qquad (20)$$

where $B_f$ is the matrix whose columns are the TX beamforming vectors for substantially all users. The multiplication by $\tilde{p}_f^{-1/2}$ in (20) is because D corresponds to estimation with TX power $\tilde{p}_f$. In block 530 an assumed receive (RX) beamforming vector such as a normalized RX MMSE vector denoted $r_{u,f}$ at subcarrier f for a single stream of user u may be calculated, based on the effective channel matrix $T_{u,f}$. The normalized RX MMSE vector, $r_{u,f}$, may be an approximated RX beamforming vector as assumed by AP 110, which may be calculated for the purpose of SINR estimation. In block 540 effective channel coefficients vector, denoted $\hat{h}_{eff,u,f}$, may be calculated by:

$$\hat{h}_{eff,u,f} := r_{u,f} (\tilde{p}_f^{-1/2} \cdot D_{u,f} V_{u,f}^*), \qquad (21)$$

It should be noted that $\hat{h}_{eff,u,f}$ may be a row vector.

In block 550 estimated SINR may be estimated for substantially each subcarrier. For example, estimation of SINR as described with relation to blocks 320-350 of FIG. 3 may be repeated for each subcarrier f, where equations (12)-(14) now read respectively:

$$(\hat{\gamma}_{u,f}^{aging+noise})^{-1} = \qquad (22)$$

$$\frac{(p_{tot,f} - p_{u,f}) \cdot \left( \|\hat{h}_{eff,u,f}\|^2 x_{aging} + x_{noise} + 2y \|\hat{h}_{eff,u,f}\| \sqrt{x_{aging} \cdot x_{noise}} \right)}{p_{u,f} |\hat{h}_{eff,u,f} b_{u,f}|^2},$$

$$(\hat{\gamma}_{u,f}^{no-err.})^{-1} := \frac{\sigma_{u,f}^2}{p_{u,f} |\hat{h}_{eff,u,f} b_{u,f}|^2}, \qquad (23)$$

and $$(\hat{\gamma}_{u,f})^{-1} := (\hat{\gamma}_{u,f}^{aging+noise})^{-1} + (\hat{\gamma}_{u,f}^{no-err.})^{-1}. \qquad (24)$$

where $p_{u,f}$ is power used during data transmission for the user u at the subcarrier f, $p_{tot,f}$ is total power at the subcarrier f, such that $(p_{tot,f} - p_{u,f})$ equals the power allocated to the other users at the subcarrier f, $b_{u,f}$ is a transmit beamforming vector for the user u at the subcarrier f, $p_{u,f} |\hat{h}_{u,eff,f} b_{u,f}|^2$ is the signal of the user u at the subcarrier f, $\|\hat{h}_{eff,u,f}\|$ is the estimated effective channel magnitude of the user u at the subcarrier f, $\|\hat{h}_{eff,u,f}\|^2$ is the estimated squared channel magnitude of the user u at the subcarrier f, and $\sigma_{u,f}^2$ is a noise variance of the user u at the subcarrier f.

In block 560 an effective SINR is calculated, for example by an effective SINR calculator. A transmission rate and MCS may be selected based on the effective SINR.

Alternatively, in case the users may have a plurality of antennas and may receive a plurality of streams, the multi-antenna—multi stream case, CSI of users participating in a next MU-MIMO transmission may be obtained in block 510. For example, according to IEEE 802.11ac standard in MU-MIMO mode, following an explicit sounding frame from AP 110, user u may return to AP 110 equivalents to the "D" and "V" parts of the SVD of the estimated channel per-subcarrier. In detail, if $\tilde{H}_{u,f} = U_{u,f} D_{u,f} V_{u,f}^*$ is an SVD of the channel estimated by user u at subcarrier f, then the returned information from that user to AP 110 may be equivalent to the families $\{D_{u,f}\}_f$, $\{V_{u,f}\}_f$ of all D's and all V's over all subcarriers.

In block 520 an effective matrix $T_{u,f}$ is calculated according to:

$$T_{u,f} := \tilde{p}_f^{-1/2} \cdot D_{u,f} V_{u,f}^* B_f, \qquad (25)$$

where $B_f$ is the matrix whose columns are the TX beamforming vectors for substantially all streams of substantially all users. In block 530 an assumed transmit beamforming vector such as a normalized RX MMSE matrix at subcarrier f, denoted $R_{u,f}$ for substantially all the streams of a user u may be calculated, based on the effective channel matrix. For example, a full MMSE beamforming matrix may be calculated based on the effective matrix $T_{u,f}$. The full MMSE beamforming matrix may include beamforming of all steams of all users. The $R_{u,f}$ matrix of user u may include the rows of the full MMSE beamforming matrix that correspond to the streams of that user. In block 540 an effective channel coefficients matrix, denoted $\hat{H}_{u,f}$, may be calculated by:

$$\hat{H}_{u,f} := R_{u,f} (\tilde{p}_f^{-1/2} \cdot D_{u,f} V_{u,f}^*). \qquad (26)$$

For stream s of user u, the effective channel coefficients vector, denoted $\hat{h}_{eff,u,s,f}$ may be row selected from $\hat{h}_{u,f}$, corresponding to stream s.

In block 550 SINR may be estimated for substantially each subcarrier. For example, estimation of SINR as described with relation to blocks 320-350 of FIG. 3 may be repeated for substantially each subcarrier f, with $\hat{h}_{eff,u,s,f}$ instead of $\hat{h}_u$, treating substantially each stream as a separate receive antenna, and using the following assumptions. Since it is unlikely that streams of the same user will interfere with each other after the MMSE RX beamforming, the value of $p_u$ in the numerator of Equation (12) may be substituted by $p_{u,f}$, the total power of user u at bin f, summed over substantially all streams. Additionally, $p_u$ in the denominator of Equations (12) and (13) may be replaced by $p_{u,s,f}$, the power allocated to stream s of user u at subcarrier f. Explicitly, Equations (12)-(14) may now read, with the various $\hat{\gamma}_{u,s,f}$ referring to the estimated SINR of stream s of user u at subcarrier f and with $b_{u,s,f}$ referring to the TX beamforming vector for user u at stream s at subcarrier f.

$$(\hat{\gamma}_{u,s,f}^{aging+noise})^{-1} = \qquad (27)$$

$$\frac{(p_{tot,f} - p_{u,f}) \cdot \left( \|\hat{h}_{eff,u,s,f}\|^2 x_{aging} + x_{noise} + 2y \|\hat{h}_{eff,u,s,f}\| \sqrt{x_{aging} \cdot x_{noise}} \right)}{p_{u,s,f} |\hat{h}_{eff,u,s,f} b_{u,s,f}|^2},$$

$$(\hat{\gamma}_{u,s,f}^{no-err.})^{-1} := \frac{\sigma_{u,f}^2}{p_{u,s,f} |\hat{h}_{eff,u,s,f} b_{u,s,f}|^2}, \qquad (28)$$

and $$(\hat{\gamma}_{u,s,f})^{-1} := (\hat{\gamma}_{u,s,f}^{aging+noise})^{-1} + (\hat{\gamma}_{u,s,f}^{no-err.})^{-1}. \qquad (29)$$

where $p_{u,s,f} |\hat{h}_{eff,u,s,f} b_{u,s,f}|^2$ is the signal of user u at stream s at subcarrier f, $\|\hat{h}_{eff,u,s,f}\|$ is the estimated effective channel magnitude of user u at stream s at subcarrier f, $\|\hat{h}_{eff,u,s,f}\|^2$ is the estimated effective squared channel magnitude of user u at stream s at subcarrier f, $\hat{\gamma}_{u,s,f}^{aging+noise}$ are per-subcarrier per-stream signal-to-interference ratios of user u, and $\hat{\gamma}_{u,s,f}^{no-err.}$ are per-subcarrier per-stream SNRs of user u. $b_{u,s,f}$ may be normalized or not normalized. In block 560 an effective SINR may be calculated for example by an effective SINR calculator. A transmission rate and MCS may be selected based on the effective SINR.

Figure 6:
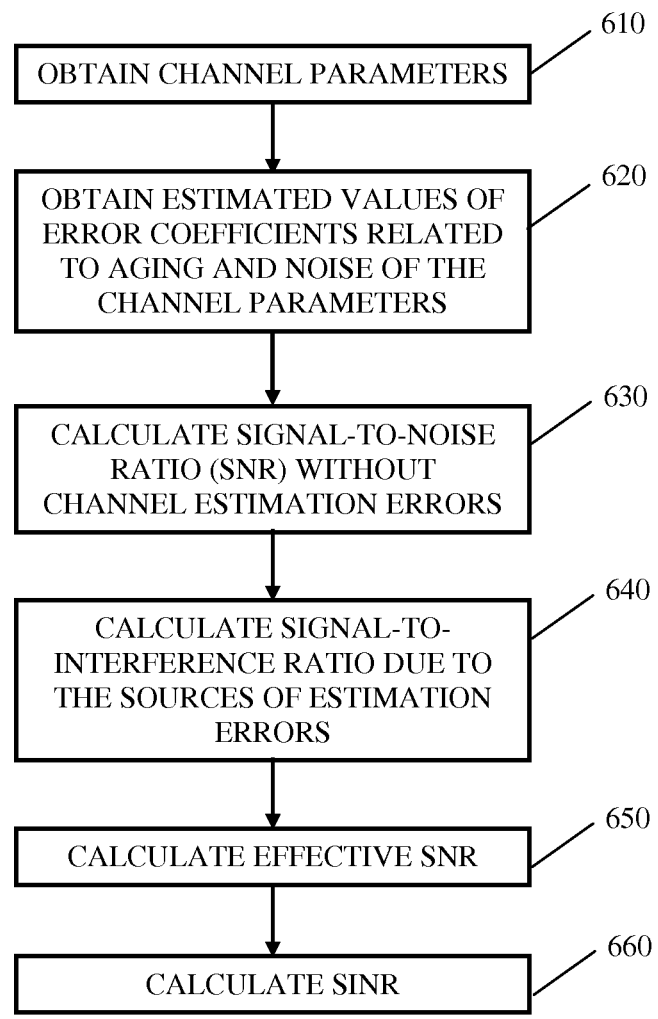
FIG. 6 is a flowchart illustration of an ANC on the effective SINR method for effective SINR estimation for multi carrier MU MIMO communication systems according to embodiments of the present invention.

Reference is now made to FIG. 6 which is a flowchart illustration of an ANC on the effective SINR method for effective SINR estimation for multi carrier MU MIMO communication systems according to embodiments of the present invention. According to embodiments of the present invention, effective SINR estimation may be performed at AP 110, for example, in goodness measure estimation block 114.

In block 610 CSI may be obtained for each subcarrier f from users that participate in a next MU-MIMO transmission. CSI may be obtained in any applicable format. For example, CSI may be obtained in the form of channel matrix, a vector of channel coefficients in case of a single antenna user, or in the form of D and V parts of the SVD of the estimated channel, or equivalents. CSI may be obtained explicitly or implicitly. For example, in case the users have a single antenna, $\hat{h}_{u,f}$ for each subcarrier f may be obtained or estimated in block 610, where $\hat{h}_{u,f}$ denotes the estimated channel vector of user u at subcarrier f. In block 620 estimated values of $x_{aging}$, $x_{noise}$ and y may be obtained values of $x_{aging}$, $x_{noise}$ and y may be similar for all subcarriers or may different between subcarriers or subcarrier groups.

In case the users have a single antenna or multiple antennas but are restricted to receive a single stream, SNR, $\hat{\gamma}_{u,f}^{no-err}$, may be calculated for each subcarrier f according to equation (13) or (18) for the single-antenna case and equations (23) and (21) for the multiple-antenna case, using the estimated channel and beamforming vector related to f in block 630. It should be noted that in the multiple-antenna case an effective estimated channel magnitude may be calculated, for example according to (21) and used. In block 640 the signal-to-interference ratio $(\hat{\gamma}_u^{aging+noise})^{-1}$ may be calculated using equation (12) with the estimated channel magnitudes, the estimated squared channel magnitudes and the signal replaced by corresponding averaged values. The averaged values may be calculated by simple arithmetic averaging, by rout-mean-square averaging, or by any other applicable averaging method. Specifically, $\|\hat{h}_u\|^2$, $\|\hat{h}_u\|$ and $|b_u^*\hat{h}_u|^2$ may be replaced by averaged values $(\|\hat{h}\|^2)_{u,avg}$, $\|\hat{h}\|_{u,avg}$, and $(|b^*\hat{h}|)_{u,avg}$ respectively, such that (12) may become:

$$(\hat{\gamma}_u^{aging+noise})^{-1} := \frac{(p_{tot} - p_u) \cdot \left[\left(\|\hat{h}\|^2\right)_{u,avg} x_{aging} + x_{noise} + 2y(\|\hat{h}\|_{u,avg})\sqrt{x_{aging} \cdot x_{noise}}\right]}{p_u\left(|b^*\hat{h}|^2\right)_{u,avg}} \quad (30)$$

Where $p_u(|b^*\hat{h}|^2)_{u,avg}$ is the signal of user u averaged over the subcarriers, $\|\hat{h}\|_{u,avg}$ is an estimated channel magnitude of the user u averaged over the subcarriers in case of a user with a single antenna and an estimated effective channel magnitude of the user u averaged over the subcarriers in case of a user with multiple antennas, $(\|\hat{h}\|^2)_{u,avg}$ is an estimated squared channel magnitude of the user u averaged over the subcarriers in case of a user with a single antenna and an estimated effective squared channel magnitude of the user u averaged over the subcarriers in case of a user with multiple antennas.

For example, $(\|\hat{h}\|^2)_{u,avg}$, $\|\hat{h}\|_{u,avg}$ and $(|b^*\hat{h}|^2)_{u,avg}$ may equal the corresponding arithmetic averages over all subcarriers, or the root mean square average over all subcarriers, or any other applicable averaging method. Specifically, $(\|\hat{h}\|^2)_{u,avg}$ of equation (30) may be replaced by $$\frac{1}{F}\sum_f \|\hat{h}_{u,f}\|^2,$$

Where F is the total number of subcarriers. in case the user has a plurality of antennas $\hat{h}_{u,f}$ may be calculated by (21). $\|\hat{h}\|_{u,avg}$ of equation (30) may be replaced by $$\frac{1}{F}\sum_f \|\hat{h}_{u,f}\|$$

or by $$\sqrt{\frac{1}{F}\sum_f \|\hat{h}_{u,f}\|^2}$$

and $(|b^*\hat{h}|^2)_{u,avg}$ may be replaced by $$\frac{1}{F}\sum_f |b_{u,f}^*\hat{h}_{u,f}|^2$$

such that (30) may become:

$$(\hat{\gamma}_u^{aging+noise})^{-1} := \frac{(p_{tot} - p_u) \cdot \left(\left(\frac{1}{F}\sum_f \|\hat{h}_{u,f}\|^2\right)x_{aging} + x_{noise} + 2y\left(\sqrt{\frac{1}{F}\sum_f \|\hat{h}_{u,f}\|^2}\right)\sqrt{x_{aging} \cdot x_{noise}}\right)}{p_u \frac{1}{F}\sum_f |b_{u,f}^*\hat{h}_{u,f}|^2} \quad (30.1)$$

Some variants of (30.1) are also possible. For example, the denominator may be replaced by $$\frac{1}{F}\sum_f p_{u,f}|b_{u,f}^*\hat{h}_{u,f}|^2,$$

where $p_{u,f}$ is the power allocated to user u at subcarrier f, so that $p_u = \Sigma_f p_{u,f}$. In case the users have a single antenna and the CSI are available at the form of families $\{d_{u,f}\}_f$, $\{v_{u,f}\}_f$ or equivalents thereof, $(\hat{\gamma}_u^{aging+noise})^{-1}$ may be calculated, for example, according to:

$$(\hat{\gamma}_{u,f}^{aging+noise})^{-1} := \frac{(p_{tot} - p_u) \cdot \left(\frac{1}{F}\left(\sum_f \frac{d_{u,f}^2}{\tilde{p}_f}\right)x_{aging} + x_{noise} + 2y \cdot \left(\sqrt{\frac{1}{F}\sum_f \frac{d_{u,f}^2}{\tilde{p}_f}}\sqrt{x_{aging} \cdot x_{noise}}\right)\right)}{\frac{1}{F}\sum_f p_{u,f} \cdot \frac{d_{u,f}^2}{\tilde{p}_f}|v_{u,f}^* b_{u,f}|^2} \quad (30.2)$$

In block 650 the effective SNR $\hat{\gamma}_u^{no-err.}(r)$ may be calculated based on the vector $\{\hat{\gamma}_{u,f}^{no-err.}\}_f$ for each scanned MCS or data rate r, for example, using an effective SNR calculator. Alternatively, a single effective SNR $\hat{\gamma}_u^{no-err.}$ may be calculated based on the vector $\{\hat{\gamma}_{u,f}^{no-err.}\}_f$ with no dependency on scanned MCS or data rate r for example, using an effective SNR calculator. The overall estimated SINR $\tilde{\gamma}_u(r)$ may be calculated according to:

$$(\tilde{\gamma}(r))^{-1} := (\hat{\gamma}_u^{no-err.}(r))^{-1} + (\hat{\gamma}_u^{aging+noise})^{-1}. \quad (31)$$

The overall estimated SINR $\tilde{\gamma}_u(r)$ may be used for selecting the maximum MCS or data rate r for which $\tilde{\gamma}_u(r)$ results in a low enough PER according to pre-determined SINR-to-PER tables.

The ANC on the effective SINR method for effective SINR estimation for multi carrier MU MIMO communication systems, as described with reference to FIG. 6 may be one possible way to avoid per-subcarrier SINR calculations by compromising the accuracy of the estimated SINR. Other equivalent method may be utilized such as advanced rate-scanning methods.

ANC on the effective SINR method for effective SINR estimation for multi carrier MU MIMO communication systems presented in FIG. 6 may be adjusted to the case the users have a plurality of antennas and may receive a plurality of streams, the vectors of SNR related to each user u and steam s along different subcarriers $\{\hat{\gamma}_{u,s,f}^{no-err.}\}_f$ may be processed by an effective SNR calculator, to obtain a single SNR for a user u and stream s, $\hat{\gamma}_{u,s}^{no-err.}$, in block 630, resulting in a family of SNR values for users u and steams s, $\{\hat{\gamma}_{u,s}^{no-err.}\}_{u,s}$. In block 640 the signal-to-interference ratios $(\hat{\gamma}_{u,s}^{aging+noise})^{-1}$ for each user u and each stream s of user u, may be calculated using:

$$(\hat{\gamma}_{u,s}^{aging+noise})^{-1} := \frac{(p_{tot} - p_u) \cdot \left((\|\hat{h}\|^2)_{u,s,avg} x_{aging} + x_{noise} + 2y(\|\hat{h}\|_{u,s,avg})\sqrt{x_{aging} \cdot x_{noise}}\right)}{(p|b^*\hat{h}|^2)_{u,s,avg}} \quad (32)$$

where, for example, $(\|\hat{h}\|^2)_{u,s,avg}$, $\|\hat{h}\|_{u,s,avg}$ and $(|p\,b^*\hat{h}|^2)_{u,s,avg}$ may equal the corresponding averaged values over all sub-carriers. The averaged values may be calculated by simple arithmetic averaging, by rout-mean-square averaging, or by any other applicable averaging method. For example, $\|\hat{h}\|_{u,s,avg}$ may be an arithmetic average or root mean square average of the effective estimated channel magnitudes over all subcarriers. Hence $\|\hat{h}\|_{u,s,avg}$ of equation (32) may be replaced by $$\frac{1}{F}\sum_f \|\hat{h}_{u,s,f}\|$$

or by $$\sqrt{\frac{1}{F}\sum_f \|\hat{h}_{u,s,f}\|^2}.$$

Similarly, $(\|\hat{h}\|^2)_{u,s,avg}$ of equation (32) may be replaced by $$\frac{1}{F}\sum_f \|\hat{h}_{u,s,f}\|^2,$$

where F is the total number of subcarriers, and $(|pb^*\hat{h}|)_{u,s,avg}$ may be replaced by $$\frac{1}{F}\sum_f p_{u,s,f}|b_{u,s,f}^* \hat{h}_{u,s,f}|^2.$$

$\hat{h}_{u,s,f}$ may be an effective channel coefficient vector calculated as described hereinabove with relation to $\hat{h}_{eff,\,u,s,f}$ and $p_{u,s,f}$ is the power allocated to stream s of user u at subcarrier f. Thus (32) may become:

$$(\hat{\gamma}_{u,s}^{aging+noise})^{-1} := \frac{(p_{tot} - p_u) \cdot \left(\left(\frac{1}{F}\sum_f \|\hat{h}_{u,s,f}\|^2\right)x_{aging} + x_{noise} + 2y\left(\sqrt{\frac{1}{F}\sum_f \|\hat{h}_{u,s,f}\|^2}\right)\sqrt{x_{aging} \cdot x_{noise}}\right)}{\frac{1}{F}\sum_f p_{u,s,f}|b_{u,s,f}^* \hat{h}_{u,s,f}|^2} \quad (32.1)$$

It is noted that as in (32) and (32.1), by using $p_u$, the total power of user u summed over all streams, in the numerator, it is assumed that only streams of other users interfere with streams of user u.

In block 650 the families of SNRs $\{\hat{\gamma}_{u,s}^{no-err.}\}_{u,s}$, and signal-to-interference ratios $\{\hat{\gamma}_{u,s}^{aging+noise}\}_{u,s}$ for each user u and each stream s calculated in blocks 630 and 640 are used to calculate estimated SINRs for all users u and all streams s of user u by:

$$(\tilde{\gamma}_{u,s})^{-1} := (\hat{\gamma}_{u,s}^{no-err.})^{-1} + (\hat{\gamma}_{u,s}^{aging+noise})^{-1} \quad (33)$$

The family $\{\tilde{\gamma}_{u,s}\}_s$ of estimated SINRs of all streams s of a single user u may be unified using an effective SINR calculator to calculate a single effective SINR per user. In case the effective SNR or SINR calculators used in block 650 and 630 utilizes the EESM method the resulted SNR or SINR may be rate or MCS dependent. As mentioned hereinabove, the SNR or SINR calculation may be carried out for each rate or MCS, and the highest rate or MCS for which $\tilde{\gamma}_u$ guaranties a low enough PER may selected for user u, alternatively other rate or MCS scanning methods may be used, as described hereinabove.

In some embodiments of the present invention described hereinabove a single antenna user was assumed. In case the user has multiple antennas, AP 110 may make assumptions as to the RX beamforming of the user, based on the CSI received from that user, for example, in a sounding feedback. The assumed RX beamforming of the user may be used by AP 110 in order to convert the multiple antennas of the user into a virtual single-antenna. Since, as stated before since the estimated channel may be noisy and aged, AP 110 may base its SINR calculations on an inaccurate assumption regarding the RX beamforming vectors. This source of error may be on top of signal-to-interference ratio due to the two sources of estimation errors, the aging error $\epsilon_u^{aging}$ and the estimation noise $\epsilon_u^{noise}$. Note that if the aging and noise coefficients are determined by experiment or by a simulation which takes into account the error in the assumed RX beamforming vectors, this extra inaccuracy may be automatically taken into account, resulting in larger error coefficients.

In some embodiments of the present application it may be decided that some of the error coefficients $x_{aging}$, $x_{noise}$ and y are more dominant than others. In such a case, the non-dominant parameters may be set to 0 so that only the dominant parameters are effective. For example, if aging is considered more dominant than estimation noise, then $x_{noise}$ and y may be set to 0, leaving only $x_{aging}$ as an effective error coefficient.

According to some embodiments of the present invention, the value the error coefficients, such as, but not limited to, $x_{aging}$, may depend on the expected aging duration, e.g. the time between channel estimation and usage of estimation-based beamforming, the expected Doppler frequency, the subcarrier grouping values in a multi-carrier system etc. In applications where several aging durations, several Doppler frequencies and different subcarrier grouping values in a multi-carrier system are expected, it is possible to store several values of the error coefficients, one for each possible combination of aging duration, Doppler frequency, different subcarrier grouping values in a multi-carrier system etc. during routine operation, the appropriate value of the error coefficients may be used, depending on the situation.

According to embodiments of the present invention, error coefficients may be estimated during operation based on related metrics received from users. For example, in some standards, such as the IEEE 802.11ac standard, it is possible to obtain SINR estimation from the users. It should be noted that the SINR estimation received from the users may be inaccurate due to noise. For example, a user u may return a single averaged SINR number, $\tilde{\gamma}_u$. Since AP 110 has an equivalent of the estimation of the channel of user u alone, as well as the TX beamforming vectors for user u, AP 110 may calculate an estimate of the average received signal strength S of user u, for example, over subcarriers and streams. Combined with the estimation of the average per-subcarrier noise variance for user u, $\sigma_u^2$, AP 110 has the approximation $\hat{\gamma}_u^{no-err.} := S/\sigma_u^2$ of the SNR with no interference at u. It should be noted that other methods may be used to get a single scalar representing the SNR of user u.

From the approximated formula:

$$\tilde{\gamma}_u^{-1} \approx (\hat{\gamma}_u^{no-err.})^{-1} + (\hat{\gamma}_u^{aging+noise})^{-1}, \quad (34)$$

the AP may extract $\hat{\gamma}_u^{aging+noise}$ and substitute it in Equation (14) instead $\hat{\gamma}_u^{aging+noise}$ appearing in (14), possibly with a per-bin estimation of $\hat{\gamma}_{u,f}^{no-err.}$, as described hereinabove. It should be noted that (32) is only an approximation because all involved quantities are averaged over subcarriers and streams. Thus, the error coefficients $x_{aging}$, $x_{noise}$ and y may be estimated and updated during actual system operation, instead of or in addition to using pre-determined values that may be inaccurate in practice.

The above method may be applied for updating the SINR estimation for several aging durations between two consecutive channel soundings, so that the SINR estimation is suited to the actual aging. This line of operation may replace the need to store several aging coefficients (one per aging duration).

Figure 7:
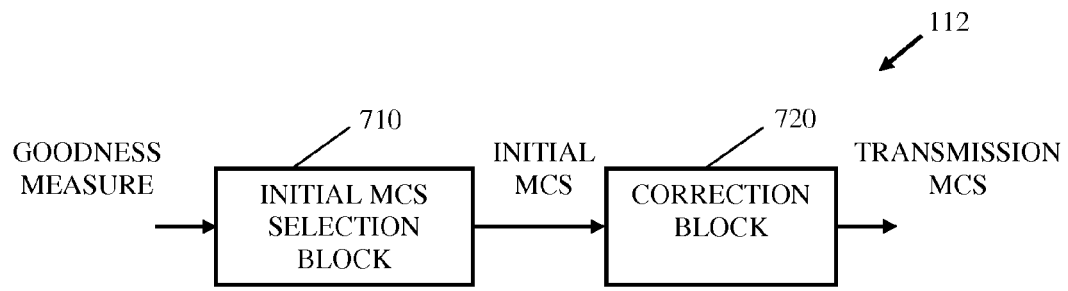
FIG. 7 is a block diagram of an exemplary implementation of MCS selection block according to embodiments of the present invention.

Reference is now made to FIG. 7 which is a block diagram of an exemplary implementation of MCS selection block 112 according to embodiments of the present invention. According to embodiments of the present invention MCS selection block 112 may include initial MCS selection block 710 and correction block 720. Initial MCS selection block 710 may receive a goodness measure such as PER, Received Signal Strength Indicator (RSSI) etc., as an input and select an initial MCS. In case the goodness measure is PER, initial MCS selection block 710 may receive a dynamic PER estimation as input and may include memory and a state machine that may select the initial MCS based on the present PER, as well as on previous PER levels and previous selected MCS levels. The dynamic PER estimation may account for frames sent close to the sounding exchange with no aging, and thus the aging correction may be done only by correction block 720. Alternatively, the dynamic PER estimation may account for all frames, including aged frames, or to any other relevant frame group. Correction block 720 may receive the initial MCS and correct the initial MCS to account for aging and noise. Correction block 720 may adjust the initial MCS to account for aging and noise based on an updated SINR estimation derived according to embodiments of the present invention.

Figure 8:
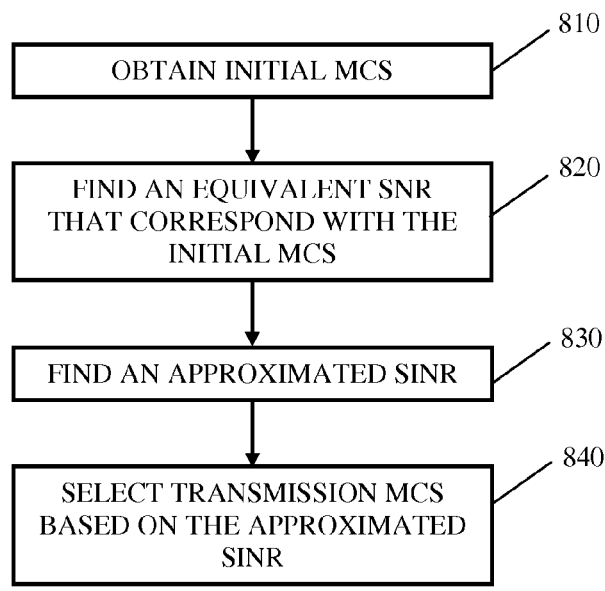
FIG. 8 is a flowchart illustration of a method for MCS adjustment for MU MIMO communication systems according to embodiments of the present invention.

Reference is now made to FIG. 8 which is a flowchart illustration of a method for MCS adjustment for MU MIMO communication systems according to embodiments of the present invention. According to embodiments of the present invention, MCS adjustment may be performed at AP 110, for example, in goodness measure estimation block 114 and MCS selection block 112.

In block 810 an estimation of the initial MCS may be obtained. The initial MCS may have been calculated according to any applicable method based on the CSI obtained, for example, in a sounding exchange. In block 820 an equivalent SNR level, denoted $\hat{\gamma}_{equ\_u}^{no-err.}$, that corresponds with the initial MCS may be found. For example, the equivalent SNR level may be selected to be the minimum SNR for achieving an allowed PER with the initial MCS. In block 830 an estimated SINR may be found. The estimated SINR may be found by adjusting the equivalent SNR to account for aging and noise of CSI. For example, signal-to-interference ratio $(\hat{\gamma}_u^{aging+noise})^{-1}$; may be calculated based on embodiments of the preset invention as described hereinabove, and added to the equivalent SNR to obtain the estimated SINR by:

$$\hat{\gamma}_u^{-1} = (\hat{\gamma}_{equ\_u}^{no-err.})^{-1} + (\hat{\gamma}_u^{aging+noise})^{-1} \quad (35)$$

For example, signal-to-interference ratio $(\hat{\gamma}_u^{aging+noise})^{-1}$ may be calculated according to embodiments presented with reference to FIGS. 3-6, etc. In block 840 a transmission MCS may be selected, based on the estimated SINR.

Figure 9:
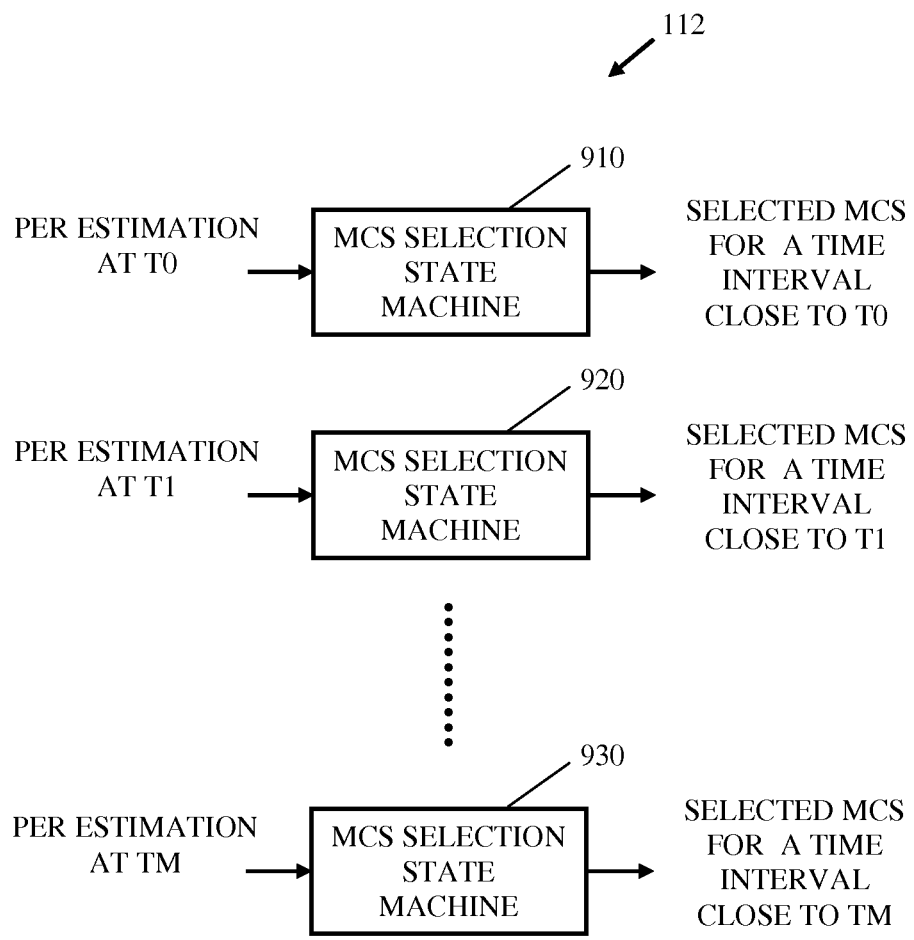
FIG. 9 is a block diagram of another exemplary implementation of MCS selection block according to embodiments of the present invention.

Reference is now made to FIG. 9, which is a block diagram of another exemplary implementation of MCS selection block 112 according to embodiments of the present invention. According to embodiments of the present invention MCS selection block 112 may include a plurality of MCS selection state machines 910, 920 and 930. Each of MCS selection state machines 910, 920 and 930 may obtain a PER estimation and calculate an appropriate MCS. Each of MCS selection state machines 910, 920 and 930 may obtain a PER estimation made at a different time point with relation to the sounding exchange. For example, MCS selection state machine 910 may obtain a PER estimation made at time $T_0$, which may be substantially the point of time of the sounding exchange, or very close to the sounding exchange. Hence, MCS selection state machine 910 may calculate MCS for packets transmitted close to the sounding exchange. Similarly, MCS selection state machine 920 may obtain a PER estimation made at time $T_1$ which may be some time after the point of time of the sounding exchange. Hence, MCS selection state machine 920 may calculate MCS for packets transmitted close to time $T_1$, and so on. Generally, an MCS selection state machine that obtains PER estimation made at time Ti may calculate MCS for packets transmitted close to that time, for example, at time interval $[(T_{i-1}+T_i)/2, (T_i+T_{i+1})/2]$. MCS selection state machines 910, 920 and 930 may be similar or substantially identical to each other, however aging may be taken into account by letting each MCS selection state machine calculate MCS based on PER statistics corresponding to different timing, and therefore to different aging. It should be readily understood that MCS selection block 112 may include a single MCS selection state machine and perform MCS selection of different time durations based on PER estimations obtained close to these time durations.

Figure 10:
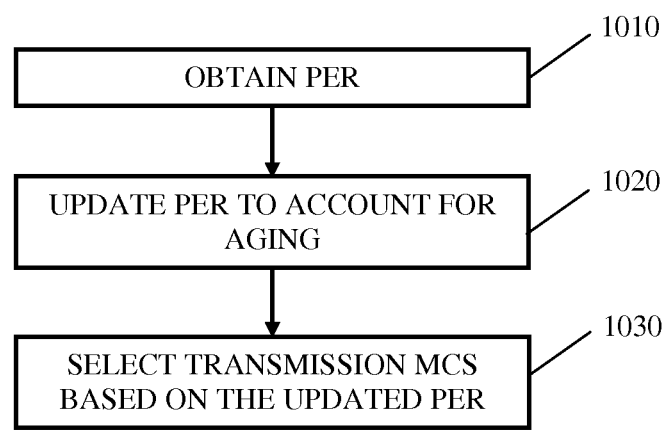
FIG. 10 is a flowchart illustration of a method for PER-based MCS adjustment for MU MIMO communication systems according to embodiments of the present invention.

Reference is now made to FIG. 10 which is a flowchart illustration of a method for PER-based MCS adjustment for MU MIMO communication systems according to embodiments of the present invention. According to embodiments of the present invention, MCS adjustment may be performed at AP 110, for example, in goodness measure estimation block 114 and MCS selection block 112.

In block 1010 the long-term average PER may be obtained. The short-term PER may be considerably higher than the long-term average PER if beamforming design is based on an aged channel estimation. Therefore, in block 1020 PER is updated to be age dependent. The updated PER may be higher than the long-term average PER to account for aging. For example, the updated PER may be min $(1, \hat{p}/(1-x_{PERaging}))$ for an aging coefficient $0 \le x_{PERaging} < 1$. $x_{PERaging}$ may be approximated based on simulations or experiments. In block 1030 rate or MCS may be selected based on the updated PER. For example, rate or MCS may be selected using an MCS selection state machine.

According to embodiments of the present invention in MU-MIMO communication systems that include optimization of the power allocation between the users and between the streams of the same user, the optimization may depend on the aging and error coefficients. When the aging and error coefficients are taken into account, it may be evident letting a difference of the form $p_{tot}-p_u$ be high may increase the estimated interference level (see, for example, equation (14)). Hence typically, power optimizations taking the aging and error coefficients into account may tend to be closer to uniform.

Some embodiments of the present invention may be implemented in software for execution by a processor-based system, for example, AP 110 and users 120, 130, 140 and 150. For example, embodiments of the present invention may be implemented in code and may be stored on a nontransitory storage medium having stored thereon instructions which can be used to program a system to perform the instructions. The storage medium may include, but is not limited to, any type of disk including floppy disks, optical disks, compact disk read-only memories (CD-ROMs), rewritable compact disk (CD-RW), and magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EE-PROMs), magnetic or optical cards, or any type of media suitable for storing electronic instructions, including programmable storage devices. Other implementations of embodiments of the present invention may comprise dedicated, custom, custom made or off the shelf hardware, firmware or a combination thereof.

Embodiments of the present invention may be realized by a system that may include components such as, but not limited to, a plurality of central processing units (CPU) or any other suitable multi-purpose or specific processors or controllers, a plurality of input units, a plurality of output units, a plurality of memory units, and a plurality of storage units. Such system may additionally include other suitable hardware components and/or software components.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for tuning transmission parameters based on estimated ratio between a signal to an estimated interference plus noise (SINR) of a user, in a multiple-user multiple-input multiple-output (MU-MIMO) communication system, the method comprising:
    obtaining channel state information (CSI) related to a channel from an access point (AP) to the user, denoted u, and to channels from the AP to other users wherein the user and the other users pertain to the MU-MIMO communication system and participate in a MU-MIMO transmission;
    obtaining error coefficients related to errors related to channel-ageing and to estimation noise of the CSI; and
    calculating the estimated SINR, wherein the estimated interference caused by the signal transmitted to the other users by the AP and affecting the signal received by said user is related to power of the other users and to the estimated channel magnitude of the user u, and to the error coefficients, wherein the estimated channel magnitude is derived from the CSI;
    selecting the transmission parameters based on the estimated SINR; and transmitting data to the user using the selected transmission parameters.

2. The method of claim 1, wherein the error coefficients comprise a first coefficient, and wherein the estimated interference comprises an ageing term, the aging term equals the power allocated to the other users multiplied by the estimated squared channel magnitude of said user, scaled by the first coefficient.

3. The method of claim 1, wherein the error coefficients comprise a second coefficient, and wherein the estimated interference comprises a noise term, the noise term equals the power allocated to the other users, scaled by the second coefficient.

4. The method of claim 1, wherein the error coefficients comprises a third coefficient and wherein the estimated interference comprises a cross term, the cross term equals the power allocated to the other users multiplied by the estimated channel magnitude of said user, scaled by the third coefficient.

5. The method of claim 1, wherein a plurality of values for the error coefficients are used for different channel aging durations, different Doppler frequencies and different subcarrier grouping values in a multi-carrier system.

6. The method of claim 1, further comprising:
calculating the error coefficients based on estimation of the estimated SINR at the user.

7. A method for tuning transmission parameters based on estimated ratio between a signal to an estimated interference plus noise (SINR) of a user, in a multiple-user multiple-input multiple-output (MU-MIMO) communication system, the method comprising:
obtaining channel state information (CSI) related to a channel from an access point (AP) to the user, denoted u, and to channels from the AP to other users wherein the user and the other users pertain to the MU-MIMO communication system and participate in a next MU-MIMO transmission;
calculating transmit beamforming matrix $b_u$ based on said CSI;
obtaining error coefficients related to errors related to channel-ageing and to estimation noise of the CSI; and
calculating the estimated SINR, wherein the estimated MU related interference caused by the signal transmitted to the other users by the AP and affecting the signal received by said user includes a combination of up to three components, each multiplied by a respective dedicated error coefficient, the first component is the power allocated to the other users multiplied by the energy of the channel to the user, the second component is the power allocated to the other users, and the third component is the power allocated to the other users multiplied by the magnitude of the channel to the user.

8. The method of claim 7, wherein transmission is performed over a plurality of subcarriers, and wherein the obtaining of the CSI comprises obtaining the CSI for substantially each subcarrier and wherein the calculating the estimated SINR comprises:
calculating a plurality of per-subcarrier estimated SINRs, each for a specific subcarrier; and
unifying the plurality of per-subcarrier estimated SINRs to receive the estimated SINR.

9. The method according to claim 7, wherein the transmission is performed over a plurality of sub-carriers, and wherein the first coefficient multiplies the average of the power allocated to other users multiplied by the average of the channel to the user, the second coefficient multiplies the average power allocated to other users by the average magnitude of the channel to the user, and the third coefficient multiplies the average power to the other users, wherein all averages are across sub-carriers.

10. The method according to claim 7, wherein an initial MCS is selected based on a goodness measure, finding an equivalent SNR denoted $\hat{\gamma}_{equ\_u}^{no-err.}$ that corresponds with the initial MCS,
wherein the calculating of the estimated SINR, denoted $\hat{\gamma}_u$, is carried out by calculating:

$$\hat{\gamma}_u^{-1} = (\hat{\gamma}_{equ\_u}^{no-err.})^{-1} + (\hat{\gamma}_u^{aging+noise})^{-1}$$

where $\hat{\gamma}_u^{aging+noise}$ is the SINR that accounts for the error coefficients.

11. The method according to claim 7, wherein the channel matrix H used in the SINR calculation is represented by D*V, wherein the D and the V are fed back by the user in an explicit sounding exchange, and wherein D and V are obtained by singular value decomposition of the original channel matrix.

12. The method according to claim 7, wherein the third component comprises a coefficient multiplied by a geometrical mean of the first and second error coefficients.

13. A data processing system comprising:
a processor; and
a non-transitory computer usable medium connected to the processor, wherein the computer usable medium contains a set of instructions for calculating a tuning transmission parameters based on estimated ratio between a signal to an estimated interference plus noise (SINR) of a user in a multiple-user multiple-input multiple-output (MU-MIMO) communication system, the MU-MIMO communication system comprises an access point (AP), the user and other users, wherein the processor is designed to carry out a set of instructions to perform a method of:
obtaining channel state information (CSI) related to a channel from the AP to the user, denoted u, and to channels from the AP to the other users, the CSI relates to estimated channel magnitudes;
obtaining error coefficients related to errors related to channel-ageing and to estimation noise of the CSI; and
calculating the estimated SINR, wherein the estimated interference caused by the signal transmitted to the other users by the AP and affecting the signal received by said user is related to power of the other users and to the estimated channel magnitude, and to the error coefficients,
wherein the processor is designed to carry out a set of instructions to further perform a method of:
selecting the transmission parameters based on the estimated SINR; and
transmitting data to the user using the selected transmission parameters.

14. The data processing system of claim 13 wherein the error coefficients comprise a first coefficient, and wherein the estimated interference comprises an ageing term, the aging term equals the power of the other users multiplied by the estimated squared channel magnitude, scaled by the first coefficient.

15. The data processing system of claim 13 wherein the error coefficients comprise a second coefficient, and wherein the estimated interference comprises a noise term, the noise term equals the power of the other users, scaled by the second coefficient.

16. The data processing system of claim 13 wherein the error coefficients comprises a third coefficient and wherein the estimated interference comprises a cross term, the cross term equals the power of the other users multiplied by the estimated channel magnitude, scaled by the third coefficient.

* * * * *